US012234431B2

(12) United States Patent
Sivik et al.

(10) Patent No.: US 12,234,431 B2
(45) Date of Patent: Feb. 25, 2025

(54) WATER-SOLUBLE UNIT DOSE ARTICLES COMPRISING WATER-SOLUBLE FIBROUS STRUCTURES AND PARTICLES

(71) Applicant: The Procter & Gamble Company, Cincinnati, OH (US)

(72) Inventors: Mark Robert Sivik, Mason, OH (US); Frank William Denome, Cincinnati, OH (US); Michael Joseph Dipaola, Cincinnati, OH (US); Rui Shen, Beijing (CN); Stephen Robert Glassmeyer, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 205 days.

(21) Appl. No.: 17/204,976

(22) Filed: Mar. 18, 2021

(65) Prior Publication Data

US 2021/0222088 A1 Jul. 22, 2021

Related U.S. Application Data

(63) Continuation of application No. PCT/CN2019/109818, filed on Oct. 3, 2019.

(Continued)

(51) Int. Cl.

| | |
|---|---|
| ***C11D 1/22*** | (2006.01) |
| ***C11D 1/06*** | (2006.01) |
| ***C11D 1/29*** | (2006.01) |
| ***C11D 3/30*** | (2006.01) |
| ***C11D 3/34*** | (2006.01) |
| ***C11D 3/37*** | (2006.01) |

(Continued)

(52) U.S. Cl.

CPC .............. *C11D 3/3409* (2013.01); *C11D 1/06* (2013.01); *C11D 1/22* (2013.01); *C11D 3/3723* (2013.01); *C11D 3/386* (2013.01); *C11D 3/395* (2013.01); *C11D 3/40* (2013.01); *C11D 3/505* (2013.01); *C11D 17/042* (2013.01); *C11D 17/06* (2013.01); *C11D 17/065* (2013.01)

(58) Field of Classification Search

CPC .... C11D 1/06; C11D 1/22; C11D 1/29; C11D 3/3723; C11D 3/386; C11D 3/505; C11D 17/06; C11D 17/065; C11D 17/042

USPC ................ 510/296, 352, 357, 439, 393, 445

See application file for complete search history.

(56) References Cited

U.S. PATENT DOCUMENTS

| | | | |
|---|---|---|---|
| 3,293,718 | A | 12/1966 | Melvin |
| 3,859,125 | A | 1/1975 | Miller |

(Continued)

FOREIGN PATENT DOCUMENTS

| | | | |
|---|---|---|---|
| AU | 2004202461 | B2 | 11/2007 |
| CA | 2695068 | A1 | 9/2010 |

(Continued)

OTHER PUBLICATIONS

15361 PCT Search Report and Written Opinion for PCT/US2019/052321 dated Dec. 12, 2019.

(Continued)

*Primary Examiner* — Gregory R Delcotto

(74) *Attorney, Agent, or Firm* — Carrie Schwartz; James E. Oehlenschlager

(57) ABSTRACT

Described herein is a water-soluble unit dose with a particle having a ratio of Linear Alkylbenzene Sulfonate to Alkylethoxylated Sulfate of greater than 1.

22 Claims, 14 Drawing Sheets

Related U.S. Application Data

(60) Provisional application No. 62/740,743, filed on Oct. 3, 2018, provisional application No. 62/796,730, filed on Jan. 25, 2019.

(51) Int. Cl.

| | |
|---|---|
| ***C11D 3/386*** | (2006.01) |
| ***C11D 3/395*** | (2006.01) |
| ***C11D 3/40*** | (2006.01) |
| ***C11D 3/50*** | (2006.01) |
| ***C11D 17/04*** | (2006.01) |
| ***C11D 17/06*** | (2006.01) |

(56) References Cited

U.S. PATENT DOCUMENTS 4,180,558 A 12/1979 Franklin
4,286,016 A 8/1981 Dimond
4,287,219 A 9/1981 Fabre
4,315,965 A 2/1982 Mason
4,342,813 A 8/1982 Erickson
4,349,531 A 9/1982 Mlodozeniec
4,377,615 A 3/1983 Suzuki
4,397,391 A 8/1983 Cornelissens et al.
4,415,617 A 11/1983 D, Elia
4,639,390 A 1/1987 Shoji
4,892,758 A 1/1990 Serbiak
4,923,660 A 5/1990 Willenberg
5,041,252 A 8/1991 Fujii
5,110,678 A 5/1992 Narukawa
5,120,888 A 6/1992 Nohr
5,135,804 A 8/1992 Harpell
5,158,810 A 10/1992 Oishi
5,208,104 A 5/1993 Ueda
5,230,853 A 7/1993 Colegrove
5,246,603 A 9/1993 Tsaur et al.
5,342,335 A 8/1994 Rhim
5,362,532 A 11/1994 Famili
5,364,627 A 11/1994 Song
5,387,147 A 2/1995 Ohshima
5,429,874 A 7/1995 Vanputte
5,455,114 A 10/1995 Ohmory
5,470,424 A 11/1995 Isaac
5,470,653 A 11/1995 Honeycutt
5,486,418 A 1/1996 Ohmory
5,518,730 A 5/1996 Fuisz
5,520,924 A 5/1996 Chapman
5,538,735 A 7/1996 Ahn
5,585,059 A 12/1996 Kobayashi
5,651,987 A 7/1997 Fuisz
5,691,015 A 11/1997 Tsukamoto
5,705,183 A 1/1998 Phillips
5,716,692 A 2/1998 Warner
5,717,026 A 2/1998 Ikimine
5,735,812 A 4/1998 Hardy
5,780,418 A 7/1998 Niinaka
5,827,586 A 10/1998 Yamashita
5,840,423 A 11/1998 Sano
5,863,887 A 1/1999 Gillette
5,879,493 A 3/1999 Johnson
5,911,224 A 6/1999 Berger
5,914,124 A 6/1999 Mahoney
5,942,179 A 8/1999 Tallentire
6,008,181 A 12/1999 Cripe
6,037,319 A 3/2000 Dickler
6,066,396 A 5/2000 Inada
6,080,346 A 6/2000 Jack
6,130,193 A 10/2000 Gillette
6,175,054 B1 1/2001 Jacques
6,197,238 B1 3/2001 Wang
6,207,274 B1 3/2001 Ferenc
6,274,162 B1 8/2001 Steffenino
6,319,510 B1 11/2001 Yates
6,406,797 B1 6/2002 Vanputte
6,420,625 B1 7/2002 Jones
6,448,462 B2 9/2002 Groitzsch
6,465,407 B2 10/2002 Hayashi
6,552,123 B1 4/2003 Katayama
6,576,575 B2 6/2003 Griesbach
6,608,121 B2 8/2003 Isozaki
6,657,004 B2 12/2003 Mizutani
6,699,826 B1 3/2004 Saijo
6,730,648 B2 5/2004 Gorlin
6,783,852 B2 8/2004 Inada
6,787,512 B1 9/2004 Verrall
6,808,598 B1 10/2004 Takeuchi
6,818,606 B1 11/2004 Hanada
6,898,921 B2 5/2005 Duffield
6,949,498 B2 9/2005 Murphy
6,956,070 B2 10/2005 Fujiwara
6,977,116 B2 12/2005 Cabell
7,026,049 B2 4/2006 Endo
7,041,628 B2 5/2006 Sunder et al.
7,067,575 B2 6/2006 Kitamura
7,083,047 B2 8/2006 Bone
7,094,744 B1 8/2006 Kobayashi
7,115,551 B2 10/2006 Hasenoehrl
7,169,740 B2 1/2007 Sommerville-roberts
7,196,026 B2 3/2007 Di
RE39,557 E 4/2007 Moe
7,226,899 B2 6/2007 Cole
7,285,520 B2 10/2007 Krzysik
7,387,787 B2 6/2008 Fox
7,407,669 B2 8/2008 Leung
7,429,273 B2 9/2008 De
7,446,084 B2 11/2008 Barthel
7,491,407 B2 2/2009 Pourdeyhimi
7,507,698 B2 3/2009 Franzolin
7,547,737 B2 6/2009 Kochvar
7,563,757 B2 7/2009 Kouvroukoglou
7,708,840 B2 5/2010 Wiedemann
7,727,946 B2 6/2010 Catalfamo
7,824,588 B2 11/2010 Yang
7,856,989 B2 12/2010 Karles
7,967,801 B2 6/2011 Hammons
8,338,358 B2 12/2012 Bernhardt et al.
8,349,232 B2 1/2013 Pourdeyhimi
8,785,361 B2 7/2014 Sivik et al.
9,074,305 B2 7/2015 Glenn, Jr. et al.
9,163,205 B2 10/2015 Sivik et al.
9,175,250 B2 11/2015 Sivik et al.
9,267,095 B2 2/2016 Delaney et al.
9,421,153 B2 8/2016 Sivik et al.
9,480,628 B2 11/2016 Sivik et al.
9,493,726 B2 11/2016 Vinson et al.
9,796,948 B2 10/2017 Shearouse
10,045,915 B2 8/2018 Glenn, Jr. et al.
2001/0037851 A1 11/2001 Mortellite
2002/0013251 A1 1/2002 Hayashi et al.
2002/0018906 A1 2/2002 Clark
2002/0098994 A1 7/2002 Zafar
2002/0161088 A1 10/2002 Kochvar
2002/0173213 A1 11/2002 Chu
2003/0017208 A1 1/2003 Ignatious
2003/0045446 A1 3/2003 Dihora
2003/0166495 A1 9/2003 Wang
2003/0185872 A1 10/2003 Kochinke
2003/0216098 A1 11/2003 Carlyle
2003/0224959 A1 12/2003 Smith
2004/0129032 A1 7/2004 Severns et al.
2004/0167256 A1 8/2004 Verrall
2004/0170836 A1 9/2004 Bond
2004/0180597 A1 9/2004 Kamada
2004/0204543 A1 10/2004 Yang
2005/0003048 A1 1/2005 Pearce
2005/0003980 A1 1/2005 Baker
2005/0003991 A1 1/2005 Macquarrie
2005/0008776 A1 1/2005 Chhabra
2005/0010010 A1 1/2005 Kitamura
2005/0136112 A1 6/2005 Gonzales
2005/0136780 A1 6/2005 Clark et al.
2005/0175646 A1 8/2005 Catroux et al.
2005/0186256 A1 8/2005 Dihel
2005/0209574 A1 9/2005 Boehringer

(56) References Cited

U.S. PATENT DOCUMENTS

| | | | |
|---|---|---|---|
| 2005/0281757 | A1 | 12/2005 | Ibrahim |
| 2006/0013869 | A1 | 1/2006 | Ignatious |
| 2006/0035042 | A1 | 2/2006 | Morken |
| 2006/0083784 | A1 | 4/2006 | Ignatious |
| 2006/0111261 | A1 | 5/2006 | Sadlowski |
| 2006/0127458 | A1 | 6/2006 | Kiser |
| 2006/0134412 | A1 | 6/2006 | Mackey |
| 2006/0160453 | A1 | 7/2006 | Suh |
| 2006/0189772 | A1 | 8/2006 | Scheibel |
| 2006/0205628 | A1 | 9/2006 | Deinhammer et al. |
| 2006/0254013 | A1 | 11/2006 | Konishi |
| 2006/0254014 | A1 | 11/2006 | Konishi |
| 2006/0258251 | A1 | 11/2006 | Konishi |
| 2006/0264130 | A1 | 11/2006 | Karles |
| 2007/0054579 | A1 | 3/2007 | Baker, Jr. |
| 2007/0110792 | A9 | 5/2007 | Simon |
| 2007/0128256 | A1 | 6/2007 | Aubrun-sonneville |
| 2007/0134304 | A1 | 6/2007 | Aubrun-sonneville |
| 2007/0134481 | A1 | 6/2007 | Aubrun-sonneville |
| 2007/0253926 | A1 | 11/2007 | Tadrowski |
| 2007/0259170 | A1 | 11/2007 | Brown |
| 2007/0259996 | A1 | 11/2007 | Vicari |
| 2007/0298064 | A1 | 12/2007 | Koslow |
| 2008/0035174 | A1 | 2/2008 | Aubrun-sonneville |
| 2008/0108748 | A1 | 5/2008 | Buckley |
| 2008/0118727 | A1 | 5/2008 | Andersen |
| 2008/0146481 | A1 | 6/2008 | Brown |
| 2008/0149119 | A1 | 6/2008 | Shen |
| 2008/0220054 | A1 | 9/2008 | Shastri |
| 2008/0226742 | A1 | 9/2008 | Srinivas |
| 2008/0226919 | A1 | 9/2008 | Hosoda |
| 2008/0242572 | A1 | 10/2008 | Icht |
| 2008/0269095 | A1 | 10/2008 | Aubrun-sonneville |
| 2008/0269099 | A1* | 10/2008 | Magennis ............ C11D 17/065 510/357 |
| 2009/0004254 | A1 | 1/2009 | Maibach |
| 2009/0041820 | A1 | 2/2009 | Wu et al. |
| 2009/0061496 | A1 | 3/2009 | Kuhn |
| 2009/0061719 | A1 | 3/2009 | Shibutani |
| 2009/0155326 | A1 | 6/2009 | Mack |
| 2009/0181587 | A1 | 7/2009 | Kang |
| 2009/0249558 | A1 | 10/2009 | Fileccia |
| 2009/0285718 | A1 | 11/2009 | Privitera |
| 2009/0286711 | A1* | 11/2009 | Somerville Roberts .................... C11D 3/08 510/351 |
| 2009/0291282 | A1 | 11/2009 | Kitamura et al. |
| 2010/0018641 | A1 | 1/2010 | Branham |
| 2010/0021517 | A1 | 1/2010 | Ahlers |
| 2010/0105821 | A1 | 4/2010 | Verrall |
| 2010/0166854 | A1 | 7/2010 | Michniak-kohn |
| 2010/0196440 | A1 | 8/2010 | Stark |
| 2010/0266668 | A1 | 10/2010 | Coffee |
| 2010/0279905 | A1 | 11/2010 | Glenn, Jr. |
| 2010/0285101 | A1 | 11/2010 | Moore |
| 2011/0136719 | A1 | 6/2011 | Jalbert |
| 2011/0159267 | A1 | 6/2011 | Lee |
| 2011/0223381 | A1 | 9/2011 | Sauter |
| 2011/0230112 | A1 | 9/2011 | Rose |
| 2011/0257060 | A1* | 10/2011 | Dykstra ............... C11D 3/3956 510/303 |
| 2011/0301070 | A1 | 12/2011 | Ochomogo |
| 2012/0021026 | A1 | 1/2012 | Glenn, Jr. |
| 2012/0027838 | A1 | 2/2012 | Gordon et al. |
| 2012/0048769 | A1 | 3/2012 | Sivik |
| 2012/0052036 | A1 | 3/2012 | Glenn, Jr. |
| 2012/0053103 | A1 | 3/2012 | Sivik |
| 2012/0053108 | A1 | 3/2012 | Glenn, Jr. |
| 2012/0058166 | A1 | 3/2012 | Glenn, Jr. |
| 2012/0082037 | A1 | 4/2012 | Wang |
| 2012/0154300 | A1 | 6/2012 | Ma |
| 2012/0172831 | A1 | 7/2012 | Darcy |
| 2012/0215148 | A1 | 8/2012 | Ewert |
| 2012/0237576 | A1 | 9/2012 | Gordon |
| 2013/0171421 | A1 | 7/2013 | Weisman |
| 2013/0172226 | A1 | 7/2013 | Dreher et al. |
| 2013/0324454 | A1* | 12/2013 | Tantawy ................. C11D 11/02 510/351 |
| 2014/0287973 | A1 | 9/2014 | Sivik |
| 2014/0366294 | A1 | 12/2014 | Roe et al. |
| 2015/0048001 | A1 | 2/2015 | Bailey |
| 2015/0104856 | A1 | 4/2015 | Astrid et al. |
| 2015/0313807 | A1 | 11/2015 | Lynch et al. |
| 2016/0010041 | A1 | 1/2016 | Sivik et al. |
| 2016/0040105 | A1 | 2/2016 | Depoot |
| 2016/0101204 | A1 | 4/2016 | Lynch et al. |
| 2016/0186095 | A1 | 6/2016 | Vockenroth et al. |
| 2016/0200501 | A1 | 7/2016 | Lee et al. |
| 2016/0271021 | A1 | 9/2016 | Glenn, Jr. et al. |
| 2016/0340624 | A1 | 11/2016 | Sivik et al. |
| 2016/0374906 | A1 | 12/2016 | Sivik et al. |
| 2017/0009191 | A1 | 1/2017 | Maes |
| 2017/0067002 | A1 | 3/2017 | Cumming |
| 2017/0164612 | A1 | 6/2017 | Ripberger et al. |
| 2017/0320105 | A1 | 11/2017 | Roozrokh et al. |
| 2018/0216050 | A1* | 8/2018 | Denome .............. C11D 17/042 |
| 2018/0216053 | A1* | 8/2018 | Denome .................. C11D 1/37 |
| 2018/0223229 | A1 | 8/2018 | Tan et al. |
| 2018/0338890 | A1 | 11/2018 | Glenn, Jr. |

FOREIGN PATENT DOCUMENTS

| | | | |
|---|---|---|---|
| DE | 102007011606 | A1 | 9/2008 |
| EP | 1275368 | A1 | 1/2003 |
| EP | 1306425 | A2 | 5/2003 |
| EP | 1409628 | B1 | 2/2006 |
| EP | 1512701 | B1 | 6/2006 |
| EP | 1887036 | A2 | 2/2008 |
| EP | 1436376 | B1 | 4/2010 |
| EP | 2226379 | A1 | 9/2010 |
| EP | 1948771 | B1 | 12/2010 |
| EP | 2319965 | A1 | 5/2011 |
| EP | 2363432 | A1 | 9/2011 |
| EP | 2363517 | A1 | 9/2011 |
| EP | 2395142 | A1 | 12/2011 |
| GB | 2107579 | A | 5/1983 |
| GB | 2375542 | A | 11/2002 |
| GB | 2449418 | A | 11/2008 |
| HU | 221299 | B1 | 9/2002 |
| JP | S62156348 | A | 7/1987 |
| JP | 3040879 | A | 2/1991 |
| JP | 3101618 | A | 4/1991 |
| JP | H09279457 | A | 10/1997 |
| JP | 10008364 | A | 1/1998 |
| JP | H10158700 | A | 6/1998 |
| JP | 2000169896 | A | 6/2000 |
| JP | 2009079329 | A | 4/2009 |
| RU | 2466182 | C2 | 11/2012 |
| RU | 2642781 | C2 | 1/2018 |
| WO | 1992006603 | A1 | 4/1992 |
| WO | 9402377 | A1 | 2/1994 |
| WO | 9404656 | A2 | 3/1994 |
| WO | 9523888 | A1 | 9/1995 |
| WO | 9957155 | A1 | 11/1999 |
| WO | 0013680 | A2 | 3/2000 |
| WO | 0027958 | A1 | 5/2000 |
| WO | 0125322 | A1 | 4/2001 |
| WO | 200154667 | A1 | 8/2001 |
| WO | 03060007 | A1 | 7/2003 |
| WO | 2004009335 | A1 | 1/2004 |
| WO | 2004081162 | A1 | 9/2004 |
| WO | 2005068604 | A1 | 7/2005 |
| WO | 2006106514 | A2 | 10/2006 |
| WO | 2007089259 | A1 | 8/2007 |
| WO | 2007093558 | A3 | 1/2008 |
| WO | 2009022761 | A1 | 2/2009 |
| WO | 2007014221 | A3 | 4/2009 |
| WO | 2009047124 | A1 | 4/2009 |
| WO | 2009103576 | A1 | 8/2009 |
| WO | 2009121900 | A1 | 10/2009 |
| WO | 2010015709 | A2 | 2/2010 |
| WO | 2011153023 | A1 | 12/2011 |
| WO | 2012003367 | A2 | 1/2012 |
| WO | 2016196698 | A1 | 12/2016 |

(56) References Cited

FOREIGN PATENT DOCUMENTS

| | | | |
|---|---|---|---|
| WO | 2017096354 | A1 | 6/2017 |
| WO | 2018140472 | A1 | 8/2018 |
| WO | 2018140668 | A1 | 8/2018 |
| WO | 2018140670 | A1 | 8/2018 |

OTHER PUBLICATIONS

Makadia, et al., "Poly Lactic-co-Glycolic Acid (PLGA) as Biodegradable ControlledDrug Delivery Carrier", Polymers, 3, pp. 1377-1397 (2011).

Smith, et al., "Nanofibrous Scaffolds and Their Biological Effects", Nantechnologiesfor the Life Sciences, vol. 9, pp. 188-215 (2006).

Wang, et al., "A Novel Controlled Release Drug Delivery System for Multiple Drugs Based on Electrospun Nanofibers 4 Containing Nanoparticles", Journal of Pharmaceutical Sciences, vol. 99, No. 12 (Dec. 2010).

* cited by examiner

WATER-SOLUBLE UNIT DOSE ARTICLES COMPRISING WATER-SOLUBLE FIBROUS STRUCTURES AND PARTICLES

FIELD OF THE INVENTION

Described herein is a household care composition, which delivers active agents onto fabric, in the form of a water-soluble unit dose article comprising a water-soluble fibrous structure and one or more particles, as well as methods for making the same.

BACKGROUND OF THE INVENTION

Water-soluble unit dose articles are desired by consumers as they provide a convenient, efficient, and clean way of dosing a fabric or hard surface treatment composition. Water-soluble unit dose articles provide a measured dosage of a treatment composition, thereby avoiding over or under dosing. Fibrous water-soluble unit dose articles are of increasing interest to consumers. The technology related to such articles continues to advance in terms of providing the desired active agents with the articles enabling the consumers to do the job that they wish to accomplish.

Many consumers use washing machines that utilize less water than prior generations. As such there is a need within fibrous water-soluble unit dose articles to formulate fibrous water-soluble unit doses that are capable of dissolving quickly in a limited amount of fluid. Faster dissolution in limited fluid allows for the release of cleaning agents so that they become readily available. Surprisingly, it has been found that water-soluble unit dose articles comprising low density particles having desirable densities and particle size distributions, as described herein, exhibit improved dissolution profiles versus other compositions while delivering similar amounts of surfactant.

SUMMARY OF THE INVENTION

Described herein is a water-soluble unit dose comprising a water-soluble fibrous structure comprising a with a particle having a ratio of Linear Alkylbenzene Sulfonate to Alkylethoxylated Sulfate of greater than 1.

DETAILED DESCRIPTION OF THE INVENTION

Definitions

Figure 1:
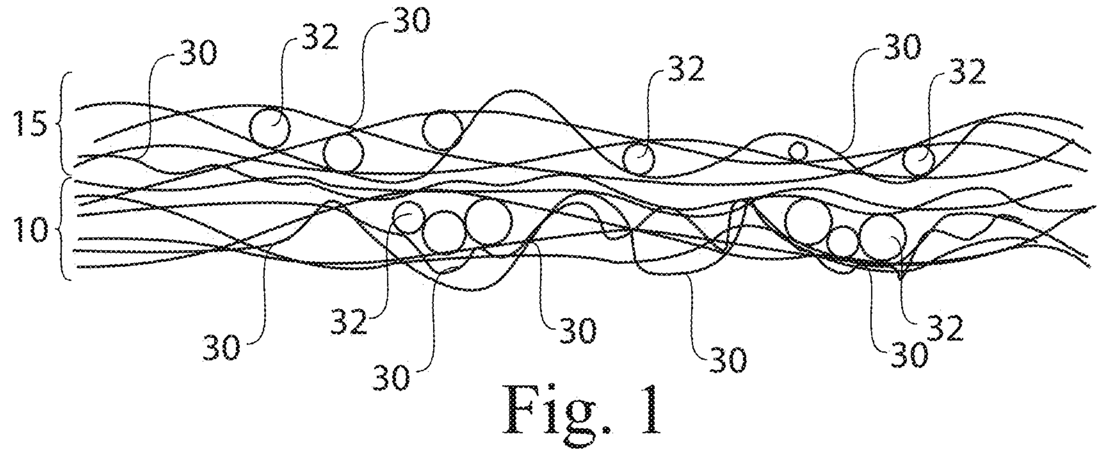
FIG. 1 is a schematic representation of a cross-sectional view of an example of a multiply fibrous structure.

Features and benefits of the present invention will become apparent from the following description, which includes examples intended to give a broad representation of the invention. Various modifications will be apparent to those skilled in the art from this description and from practice of the invention. The scope is not intended to be limited to the particular forms disclosed and the invention covers all modifications, equivalents, and alternatives falling within the spirit and scope of the invention as defined by the claims.

As used herein, the articles including "the," "a" and "an" when used in a claim or in the specification, are understood to mean one or more of what is claimed or described.

As used herein, the terms "include," "includes" and "including" are meant to be non-limiting.

The term "substantially free of" or "substantially free from" as used herein refers to either the complete absence of an ingredient or a minimal amount thereof merely as impurity or unintended byproduct of another ingredient. A composition that is "substantially free" of/from a component means that the composition comprises less than about 0.5%, 0.25%, 0.1%, 0.05%, or 0.01%, or even 0%, by weight of the composition, of the component.

It should be understood that the term "comprise" includes also embodiments where the term "comprises" means "consists of" or "consists essentially of."

As used herein, "sebum" refers to an oily secretion of the sebaceous glands and any artificial compositions intended to replicate an oily secretion of the sebaceous glands. Representative sebum includes and is not limited to artificial sebum as described in EP1482907, artificial sebum described in EP0142830B1, artificial sebum according to D4265-14, and artificial sebum sold as CFT PCS-132. CFT PCS-132 has an estimated composition of 18% Free Fatty Acids, 32% Beef Tallow (Stearic/Oleic Acid Triglycerides), 4% Fatty Acid Triglycerides, 12% Hydrocarbon Mixture, 18% Lanoline (Waxy Esters, C13-C24), 12% Cutina (waxes and wax esters), and 4% Cholesterol.

All cited patents and other documents are, in relevant part, incorporated by reference as if fully restated herein. The citation of any patent or other document is not an admission that the cited patent or other document is prior art with respect to the present invention.

In this description, all concentrations and ratios are on a weight basis of the composition unless otherwise specified.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Fibrous Water-Soluble Unit Dose Article

As used herein, the phrases "water-soluble unit dose article," "water-soluble fibrous structure", and "water-soluble fibrous element" mean that the unit dose article, fibrous structure, and fibrous element are miscible in water. In other words, the unit dose article, fibrous structure, or fibrous element is capable of forming a homogeneous solution with water at ambient conditions. "Ambient conditions" as used herein means 23° C.±1.0° C. and a relative humidity of 50%±2%. The water-soluble unit dose article may contain insoluble materials, which are dispersible in aqueous wash conditions to a suspension mean particle size that is less than about 20 microns, or less than about 50 microns.

The fibrous water-soluble unit dose article may include any of the disclosures found in U.S. patent application Ser. No. 15/880,594 filed on Jan. 26, 2018; U.S. patent application Ser. No. 15/880,599 filed Jan. 26, 2018; and U.S. patent application Ser. No. 15/880,604 filed Jan. 26, 2018; incorporated by reference in their entirety.

These fibrous water-soluble unit dose articles can be dissolved under various wash conditions, e.g., low temperature, low water and/or short wash cycles or cycles where consumers have been overloading the machine, especially with items having high water absorption capacities, while providing sufficient delivery of active agents for the intended effect on the target consumer substrates (with similar performance as today's liquid products). Furthermore, the water-soluble unit dose articles described herein can be produced in an economical manner by spinning fibers comprising active agents. The water-soluble unit do se articles described herein also have improved cleaning performance.

The surface of the fibrous water-soluble unit dose article may comprise a printed area. The printed area may cover between about 10% and about 100% of the surface of the article. The area of print may comprise inks, pigments, dyes, bluing agents or mixtures thereof. The area of print may be opaque, translucent or transparent. The area of print may comprise a single color or multiple colors. The printed area maybe on more than one side of the article and contain instructional text and/or graphics. The surface of the water-soluble unit dose article may comprise an aversive agent, for example a bittering agent. Suitable bittering agents include, but are not limited to, naringin, sucrose octacetate, quinine hydrochloride, denatonium benzoate, or mixtures thereof. Any suitable level of aversive agent may be used. Suitable levels include, but are not limited to, 1 to 5000 ppm, or even 100 to 2500 ppm, or even 250 to 2000 ppm.

The water-soluble unit dose articles disclosed herein comprise a water-soluble fibrous structure and one or more particles. The water-soluble fibrous structure may comprise a plurality of fibrous elements, for example a plurality of filaments. The one or more particles, for example one or more active agent-containing particles, may be distributed throughout the structure. The water-soluble unit dose article may comprise a plurality of two or more and/or three or more fibrous elements that are inter-entangled or otherwise associated with one another to form a fibrous structure and one or more particles, which may be distributed throughout the fibrous structure.

The fibrous water-soluble unit dose articles may exhibit a thickness of greater than 0.01 mm and/or greater than 0.05 mm and/or greater than 0.1 mm and/or to about 100 mm and/or to about 50 mm and/or to about 20 mm and/or to about 10 mm and/or to about 5 mm and/or to about 2 mm and/or to about 0.5 mm and/or to about 0.3 mm as measured by the Thickness Test Method described herein.

The fibrous water-soluble unit dose articles may have basis weights of from about 500 grams/$m^2$ to about 5,000 grams/$m^2$, or from about 1,000 grams/$m^2$ to about 4,000 grams/$m^2$, or from about 1,500 gram s/$m^2$ to about 3,500 gram s/$m^2$, or from about 2,000 gram s/$m^2$ to about 3,000 grams/$m^2$, as measured according to the Basis Weight Test Method described herein.

The fibrous water-soluble unit dose article may comprise a water-soluble fibrous structure and a plurality of particles distributed throughout the structure, where the water-soluble fibrous structure comprises a plurality of identical or substantially identical, from a compositional perspective, fibrous elements. The water-soluble fibrous structure may comprise two or more different fibrous elements. Non-limiting examples of differences in the fibrous elements may be physical differences, such as differences in diameter, length, texture, shape, rigidness, elasticity, and the like; chemical differences, such as crosslinking level, solubility, melting point, Tg, active agent, filament-forming material, color, level of active agent, basis weight, level of filament-forming material, presence of any coating on fibrous element, biodegradable or not, hydrophobic or not, contact angle, and the like; differences in whether the fibrous element loses its physical structure when the fibrous element is exposed to conditions of intended use; differences in whether the fibrous element's morphology changes when the fibrous element is exposed to conditions of intended use; and differences in rate at which the fibrous element releases one or more of its active agents when the fibrous element is exposed to conditions of intended use. Two or more fibrous elements within the fibrous structure may comprise different active agents. This may be the case where the different active agents may be incompatible with one another, for example an anionic surfactant and a cationic polymer. When using different fibrous elements, the resulting structure may exhibit different wetting, imbibitions, and solubility characteristics.

The fibrous water-soluble unit dose article may exhibit different regions, such as different regions of basis weight, density, caliper, and/or wetting characteristics. The fibrous water-soluble unit dose article may be compressed at the point of edge sealing. The fibrous water-soluble unit dose article may comprise texture on one or more of its surfaces. A surface of the fibrous water-soluble unit dose article may comprise a pattern, such as a non-random, repeating pattern. The fibrous water-soluble unit dose article may comprise apertures. The fibrous water-soluble unit dose article may comprise a fibrous structure having discrete regions of fibrous elements that differ from other regions of fibrous elements in the structure. The fibrous water-soluble unit dose article may be used as is or it may be coated with one or more active agents.

The fibrous water-soluble unit dose article may comprise one or more plies. The fibrous water-soluble unit dose article may comprise at least two and/or at least three and/or at least four and/or at least five plies. The fibrous plies can be fibrous structures. Each ply may comprise one or more layers, for example one or more fibrous element layers, one or more particle layers, and/or one or more fibrous element/particle mixture layers. The layer(s) may be sealed. In particular, particle layers and fibrous element/particle mixture layers may be sealed, such that the particles do not leak out. The water-soluble unit dose articles may comprise multiple plies, where each ply comprises two layers, where one layer is a fibrous element layer and one layer is a fibrous element/particle mixture layer, and where the multiple plies are sealed (e.g., at the edges) together. Sealing may inhibit the leakage of particles as well as help the unit dose article maintain its original structure. However, upon addition of the water-soluble unit dose article to water, the unit dose article dissolves and releases the particles into the wash liquor.

Figure 2:
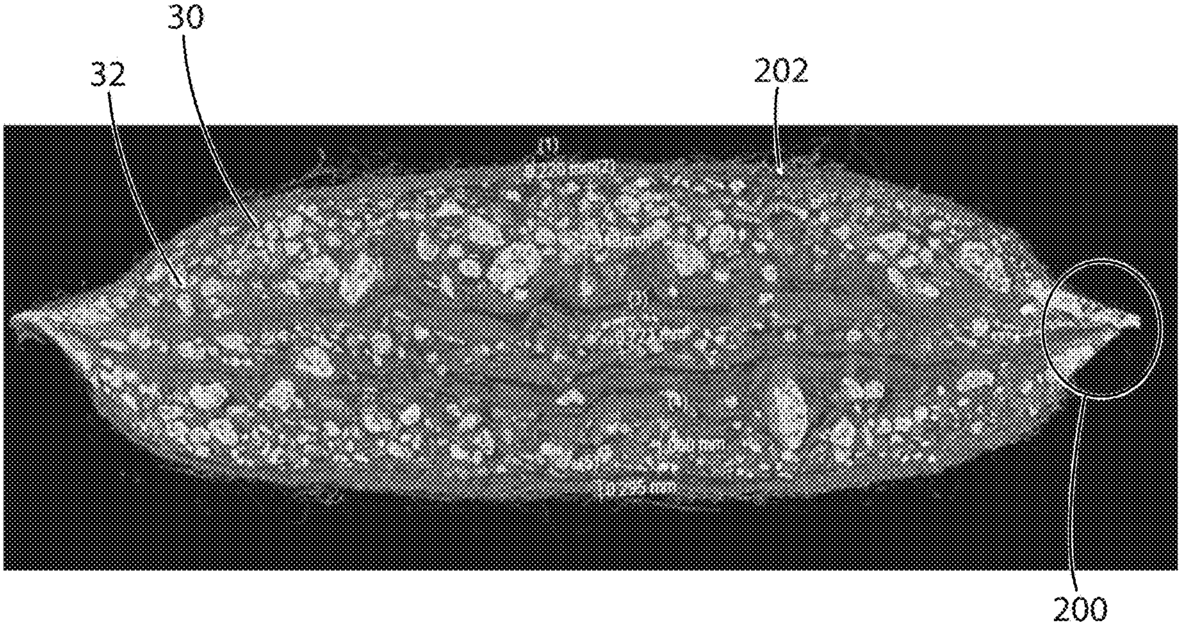
FIG. 2 is a micro-CT scan image showing a cross-sectional view of an example of a water-soluble unit dose article.

FIG. 2 is a micro-CT scan image showing a cross-sectional view of an example of a water-soluble unit dose article comprising three plies, where each ply is formed of two layers, a fibrous element layer and a fibrous element/particle mixture layer. Each of the three plies comprises a plurality of fibrous elements 30, in this case filaments, and a plurality of particles 32. The multiply, multilayer article is sealed at the edges 200, so that the particles do not leak out. The outer surfaces of the article 202 are fibrous element layers.

The fibrous elements and/or particles may be arranged within the water-soluble unit dose article, in a single ply or in multiple plies, to provide the article with two or more regions that comprise different active agents. For example, one region of the article may comprise bleaching agents and/or surfactants and another region of the article may comprise softening agents.

The fibrous water-soluble unit dose article can be viewed hierarchically starting from the form in which the consumer interacts with the water-soluble article and working backward to the raw materials from which the water-soluble article is made, e.g., plies, fibrous structures, and particles. The fibrous plies can be fibrous structures. For example, FIG. 1 shows a first ply 10 and a second ply 15 associated with the first ply 10, wherein the first ply 10 and the second ply 15 each comprises a plurality of fibrous elements 30, in this case filaments, and a plurality of particles 32. In the second ply 15, the particles 32 are dispersed randomly, in the x, y, and z axes, and in the first ply, the particles 32 are in pockets.

The water-soluble unit dose article described herein may comprise a water-soluble fibrous structure and one or more rheology-modified particles comprising: (a) from about 10 wt % to about 80 wt % of an alkylalkoxylated sulfate; and (b) from about 0.5 wt % to about 20 wt % of a rheology modifier. The particles described herein may comprise one or more additional active agents (in addition to surfactant as described hereinabove).

The rheology-modified particle may comprise:

(a) from about 10 wt % to about 80 wt % alkylalkoxylated sulfate;

(b) from about 0.5 wt % to about 20 wt % of a rheology modifier selected from the group consisting an alkoxylated amine, preferably an alkoxylated polyamine, more preferably a quaternized or non-quaternized alkoxylated polyethyleneimine, wherein said alkoxylated polyalkyleneimine has a polyalkyleneimine core with one or more alkoxy side chains bonded to at least one nitrogen atom in the polyalkyleneimine core, an ethylene oxide-propylene oxide-ethylene oxide ($EOx_1POyEOx_2$) triblock copolymer wherein each of $x_1$ and $x_2$ is in the range of about 2 to about 140 and y is in the range of from about 15 to about 70, and mixtures thereof.

As used herein, the term "rheology modifier" means a material that interacts with concentrated surfactants, preferably concentrated surfactants having a mesomorphic phase structure, in a way that substantially reduces the viscosity and elasticity of said concentrated surfactant. Suitable rheology modifiers include, but are not limited to, sorbitol ethoxylate, glycerol ethoxylate, sorbitan esters, tallow alkyl ethoxylated alcohol, ethylene oxide-propylene oxide-ethylene oxide ($EOx_1POyEOx_2$) triblock copolymers wherein each of $x_1$ and $x_2$ is in the range of about 2 to about 140 and y is in the range of from about 15 to about 70, alkoxylated amines, alkoxylated polyamines, polyethyleneimine (PEI), alkoxylated variants of PEI, and preferably ethoxylated PEI, and mixtures thereof. The rheology modifier may comprise one of the polymers described above, for example, ethoxylated PEI, in combination with a polyethylene glycol (PEG) having a weight average molecular weight of about 2,000 Daltons to about 8,000 Daltons.

As used herein, the term "functional rheology modifier" means a rheology modifier that has additional detergent functionality. In some cases, a dispersant polymer, described herein below, may also function as a functional rheology modifier. A functional rheology modifier may be present in the detergent particles of the current invention at a level of from about 0.5% to about 20%, preferably from about 1% to about 15%, more preferably from about 2% to about 10% by weight of the composition.

Without being limited by theory, it is believed that functional rheology modifiers are able to interact with the molecular structure of intermediate-phase surfactants, especially alcohol-based anionic sulfate surfactants, said intermediate phases having more water than solid-phase surfactant, and less water than micellar phases typical of wash solutions. In other words, intermediate phase surfactants represent a transitional state from solid to micellar phase that may be achieved in the successful use of fibrous water-soluble unit dose articles comprising a water-soluble fibrous structure and particles; if the rheology of this intermediate state is too viscous or sticky, it may under circumstances of insufficient local dilution and/or insufficient shear result in undesired residue on fabrics. By substantially reducing the viscosity and elasticity of said intermediate phases, rheology modifiers aid dispersion, mitigating the risk of forming residue on fabrics. Further, for any residue, e.g., lump-gels, that may form, rheology modifiers can reduce their persistence. The net effect is to mitigate the occurrence of surfactant residues that persist on fabrics through the wash.

Alkoxylated Amine: The alkoxylated amine may be partially or fully protonated or not protonated across the pH range of the concentrated surfactant mixture. Alternatively, the alkoxylated amine may be partially or fully quaternized. The alkoxylated amine may be non-quaternized. The alkoxylated amine may comprise ethoxylate (EO) groups.

The alkoxylated amine may be linear, branched, or combinations thereof, preferably branched.

The alkoxylated amine may contain two or more amine moieties, such as N,N,N',N'-tetra(2-hydroxyethyl)ethylenediamine (also described as a type of hydroxylalkylamine). N,N,N',N'-tetra(2-hydroxyethyl)ethylenediamine also functions as a chelant.

The alkoxylated amine may comprise (or be) an alkoxylated amine comprises an alkoxylated polyalkyleneimine. The alkoxylated polyalkyleneimine may be an alkoxylated polyethyleneimine (PEI).

Typically, the alkoxylated polyalkyleneimine polymer comprises a polyalkyleneimine backbone. The polyalkyleneimine may comprise C2 alkyl groups, C3 alkyl groups, or mixtures thereof, preferably C2 alkyl groups. The alkoxylated polyalkyleneimine polymer may have a polyethyleneimine ("PEI") backbone.

The alkoxylated PEI may comprise a polyethyleneimine backbone having a weight average molecular weight of from about 400 to about 1000, or from about 500 to about 750, or from about 550 to about 650, or about 600, as determined prior to ethoxylation.

The PEI backbones of the polymers described herein, prior to alkoxylation, may have the general empirical formula:

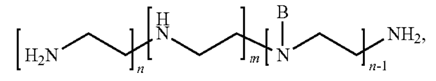

where B represents a continuation of this structure by branching. In some aspects, n+m is equal to or greater than 8, or 10, or 12, or 14, or 18, or 22.

The alkoxylated polyalkyleneimine polymer comprises alkoxylated nitrogen groups. The alkoxylated polyalkyleneimine polymer may independently comprise, on average per alkoxylated nitrogen, up to about 50, or up to about 40, or up to about 35, or up to about 30, or up to about 25, or up to about 20, alkoxylate groups. The alkoxylated polyalkyleneimine polymer may independently comprise, on average per alkoxylated nitrogen, at least about 5, or at least about 10, or at least about 15, or at least about 20, alkoxylate groups.

The alkoxylated polyalkyleneimine polymer, preferably alkoxylated PEI, may comprise ethoxylate (EO) groups, propoxylate (PO) groups, or combinations thereof. The alkoxylated polyalkyleneimine polymer, preferably alkoxylated PEI, may comprise ethoxylate (EO) groups. The alkoxylated polyalkyleneimine polymer, preferably alkoxylated PEI, may be free of propoxyate (PO) groups.

The alkoxylated amine, preferably the alkoxylated polyalkyleneimine polymer, more preferably alkoxylated PEI, may comprise on average per alkoxylated nitrogen, about 1-50 ethoxylate (EO) groups and about 0-5 propoxylate (PO) groups. The alkoxylated polyalkyleneimine polymer, preferably alkoxylated PEI, may comprise on average per alkoxylated nitrogen, about 1-50 ethoxylate (EO) groups and is free of propoxylate (PO) groups. The alkoxylated polyalkyleneimine polymer, preferably alkoxylated PEI, may comprise on average per alkoxylated nitrogen, about 10-30 ethoxylate (EO) groups, preferably about 15-25 ethoxylate (EO) groups.

Suitable polyamines include low molecular weight, water soluble, and lightly alkoxylated ethoxylated/propoxylated polyalkyleneamine polymers. By "lightly alkoxylated," it is meant the polymers of this invention average from about 0.5 to about 20, or from 0.5 to about 10, alkoxylations per nitrogen. The polyamines may be "substantially non-charged," meaning that there are no more than about 2 positive charges for every about 40 nitrogens present in the backbone of the polyalkyleneamine polymer at pH 10, or at pH 7; it is recognized, however, that the charge density of the polymers may vary with pH.

Suitable alkoxylated polyalkyleneimines, such as PEI600 EO20, are available from BASF (Ludwigshafen, Germany).

Ethylene oxide-propylene oxide-ethylene oxide (EOx1POyEOx2) triblock copolymer: In the ethylene oxide-propylene oxide-ethylene oxide ($EOx_1POyEOx_2$) triblock copolymer, each of $x_1$ and $x_2$ is in the range of about 2 to about 140 and y is in the range of from about 15 to about 70. The ethylene oxide-propylene oxide-ethylene oxide ($EOx_1POyEOx_2$) triblock copolymer preferably has an average propylene oxide chain length of between 20 and 70, preferably between 30 and 60, more preferably between 45 and 55 propylene oxide units.

Preferably, the ethylene oxide-propylene oxide-ethylene oxide ($EOx_1POyEOx_2$) triblock copolymer has a weight average molecular weight of between about 1000 and about 10,000 Daltons, preferably between about 1500 and about 8000 Daltons, more preferably between about 2000 and about 7000 Daltons, even more preferably between about 2500 and about 5000 Daltons, most preferably between about 3500 and about 3800 Daltons.

Preferably, each ethylene oxide block or chain independently has an average chain length of between 2 and 90, preferably 3 and 50, more preferably between 4 and 20 ethylene oxide units.

Preferably, the copolymer comprises between 10% and 90%, preferably between 15% and 50%, most preferably between 15% and 25% by weight of the copolymer of the combined ethylene-oxide blocks. Most preferably the total ethylene oxide content is equally split over the two ethylene oxide blocks. Equally split herein means each ethylene oxide block comprising on average between 40% and 60% preferably between 45% and 55%, even more preferably between 48% and 52%, most preferably 50% of the total number of ethylene oxide units, the % of both ethylene oxide blocks adding up to 100%. Some ethylene oxide-propylene oxide-ethylene oxide ($EOx_1POyEOx_2$) triblock copolymer, where each of $x_1$ and $x_2$ is in the range of about 2 to about 140 and y is in the range of from about 15 to about 70, improve cleaning.

Preferably the copolymer has a weight average molecular weight between about 3500 and about 3800 Daltons, a propylene oxide content between 45 and 55 propylene oxide units, and an ethylene oxide content of between 4 and 20 ethylene oxide units per ethylene oxide block.

Preferably, the ethylene oxide-propylene oxide-ethylene oxide ($EOx_1POyEOx_2$) triblock copolymer has a weight average molecular weight of between 1000 and 10,000 Daltons, preferably between 1500 and 8000 Daltons, more preferably between 2000 and 7500 Daltons.

Preferably, the copolymer comprises between 10% and 95%, preferably between 12% and 90%, most preferably between 15% and 85% by weight of the copolymer of the combined ethylene-oxide blocks. Some ethylene oxide-propylene oxide-ethylene oxide ($EOx_1POyEOx_2$) triblock copolymers, where each of $x_1$ and $x_2$ is in the range of about 2 to about 140 and y is in the range of from about 15 to about 70, improve dissolution.

Suitable ethylene oxide—propylene oxide—ethylene oxide triblock copolymers are commercially available under the Pluronic PE series from the BASF company, or under the Tergitol L series from the Dow Chemical Company. A particularly suitable material is Pluronic PE 9200.

Alkylalkoxylated Sulfate: The alkylalkoxylated sulfate (AAS) may be an alkylethoxylated sulfate (AES), preferably an ethoxylated $C_{12}$-$C_{18}$ alkyl sulfate having an average degree of ethoxylation of from about 0.5 to about 3.0.

Typically, the weight ratio of alkylalkoxylated sulfate to rheology modifier is in the range of from 4:1 to 40:1. The weight ratio of alkylalkoxylated sulfate to rheology modifier may depend on the molecular weight of alcohol precursors of the alkylalkoxylated sulfate, degree of alkoxylation, and blend ratio of LAS/AES in a blended surfactant system. For example, for a degree of ethoxylation of about 1.0 (e.g., $NaAE_1S$), an $NaLAS/NaAE_1S$ blend ratio of about 1/3, and an AE1 alcohol precursor having a 12-15 carbon chain-length blend, the functional rheology modifier/$NaAE_1S$ mass ratio may be at least about 4% to improve dissolution, such as for example, between 5% and 10%; for a higher MW alcohol precursor having a 14-15 carbon chain-length blend, the preferred functional rheology modifier/NaAE1S mass ratio may be at least about 9%, such as, for example between 9% and 20%. The level of functional rheology modifier can be adjusted to maintain product dissolution over a range of possible anionic surfactant materials and their blend ratios.

The mass of rheology modifier (RM) relative to mass of NaAES surfactant may follow the following relationship, RM/NaAES≥f(alc)/(a*(LAS/AES)+b), where f(alc) is a function of the structure and molecular weight of the alcohol used to make the AES surfactant, (LAS/AES) is the blend ratio of LAS to AES in the surfactant paste, a~30, and b~2. For a reference blend of predominantly C12-C15 linear alcohol ethoxylate (C25AE1), f(alc)~1.0; for a blend of predominantly C14-C15 linear alcohol ethoxylate (C45AE1), f(alc)~1.2. The above guideline is further dependent on the degree of ethoxylation and any branching structure of ethoxylated alcohol precursors to the AES surfactant. The above guideline can be expressed as a Guidance Ratio, where values of ≥1 may indicate improved dissolution, and values <1 may indicate worse dissolution. The Guidance Ratio is: (RM/NaAES)/(f(alc)/(30*(LAS/AES)+2))

The particle may comprise from about 15 wt % to about 60 wt %, or from 20 wt % to 40 wt % alkylalkoxylated sulfate, or from 30 wt % to 80 wt % or even from 50 wt % to 70 wt % alkylalkoxylated sulfate.

The particle may comprise alkylbenzene sulfonate, for example, linear alkylbenzene sulfonate (LAS). The particle may comprise from 1 wt % to 50 wt % alkylbenzene sulfonate, or from 5 wt % to 30 wt % alkylbenzene sulfonate.

The particle may have a particle size distribution such that the D50 is from greater than about 150 micrometers to less than about 1700 micrometers. The particle may have a particle size distribution such that the D50 is from greater than about 212 micrometers to less than about 1180 micrometers. The particle may have a particle size distribution such that the D50 is from greater than about 300 micrometers to less than about 850 micrometers. The particle may have a particle size distribution such that the D50 is from greater than about 350 micrometers to less than about 700 micrometers. The particle may have a particle size distribution such that the D20 is greater than about 150 micrometers and the D80 is less than about 1400 micrometers. The particle may have a particle size distribution such that the D20 is greater than about 200 micrometers and the D80 is less than about 1180 micrometers. The particle may have a particle size distribution such that the D20 is greater than about 250 micrometers and the D80 is less than about 1000 micrometers. The particle may have a particle size distribution such that the D10 is greater than about 150 micrometers and the D90 is less than about 1400 micrometers. The particle may have a particle size distribution such that the D10 is greater than about 200 micrometers and the D90 is less than about 1180 micrometers. The particle may have a particle size distribution such that the D10 is greater than about 250 micrometers and the D90 is less than about 1000 micrometers.

The particle may be used in a bead-like detergent or derivative thereof. The particle may have a particle size distribution such that the D50 is from greater than about 1 mm to less than about 4.75 mm. The particle may have a particle size distribution such that the D50 is from greater than about 1.7 mm to less than about 3.5 mm. The particle may have a particle size distribution such that the D20 is greater than about 1 mm and the D80 is less than about 4.75 mm. The particle may have a particle size distribution such that the D20 is greater than about 1.7 mm and the D80 is less than about 3.5 mm. The particle may have a particle size distribution such that the D10 is greater than about 1 mm and the D90 is less than about 4.75 mm. The particle may have a particle size distribution such that the D10 is greater than about 1.7 mm and the D90 is less than about 3.5 mm.

The particle's size distribution is measured according to applicants' Granular Size Distribution Test Method.

The particle may comprise from about 10 wt % to about 80 wt % detergent builder, preferably from about 20 wt % to about 60 wt %, preferably from about 30 wt % to about 50 wt %.

The particle may comprise from about 2 wt % to about 40 wt % buffering agent, preferably from about 5 wt % to about 30 wt %, preferably from about 10 wt % to about 20 wt %.

The particle may comprise from about 2 wt % to about 20 wt % chelant, preferably from about 5 wt % to about 10 wt %.

The particle may comprise from about 2 wt % to about 20 wt % dispersant polymer, preferably from about 5 wt % to about 10 wt %.

The particle may comprise from 0.5 wt % to 15 wt % of a soluble film or fiber-structuring polymer. Examples of soluble film or fiber structuring polymers include, but are not limited to, polyvinyl alcohol, polyvinyl pyrillidone, polyethelene oxide, modified starch or cellulose polymers, and mixtures thereof. Such polymers may be present in product recycle streams comprising soluble fiber or film materials, for example unitary dose products comprising pouch material, where it is advantageous to incorporate said recycle materials into the current particle.

The particle may have a density of less than 500 g/L. The particle may have a density of less than 450 g/L such as, for example between 50 g/L and 450 g/L, between 100 g/L and 400 g/L, between 150 g/L and 350 g/L, between 200 g/L and 400 g/L, between 250 g/L and 400 g/L, or between 300 g/L and 400 g/L.

The particle may have a density of between 250 g/L to 400 g/L while having a particle size distribution such that the D10 is greater than about 300 micrometers and the D90 is less than about 1100 micrometers. The particle may have a particle size distribution such that the D10 is between 300 and 500 micrometers.

Applicants have found that by using low density particles that fall within desirable size distributions, one can deliver a similar level of surfactant as higher density particles while greatly increasing the dissolution rate and availability of the surfactant.

Additionally, the use of low density high active particles allows for the use of an increased amount of particles thereby delivering a higher level of particle percentage as a function of the total finished pad weight percentage.

Further, as shown in Table 5, the use of low density particles allows for a significant increase in LAS surfactant to greater than 20% of the total fibrous product, such as, between 20% and 40%.

The rheology-modified particle may be coated or at least partially coated with a layer composition, for example as disclosed in US2007/0196502. Preferably the layer composition comprises non-surfactant actives. More preferably, said non-surfactant actives are selected from the group consisting builder, buffer and dispersant polymer. Even more preferably, said non-surfactant actives are selected from the group consisting of zeolite-A, sodium carbonate, sodium bicarbonate, and a soluble polycarboxylate polymer. This is especially advantageous when the actives (for non-limiting example AES) are suitable for cleaning in cold-water and/or high hardness wash water conditions. The presence of the actives in the layer promotes the initial dissolution of the cold-water and/or hardness-tolerant chemistry. While not being bound by theory, it is hypothesized that having cold-water and hardness-tolerant chemistries earlier in the order of dissolution can protect the more conventional cleaning actives (for non-limiting example LAS surfactant), resulting in superior overall cleaning performance.

Process of Making Rheology-Modified Particle

A concentrated aqueous paste comprising a mixture of alkylalkoxylated sulfate anionic detersive surfactant and a rheology modifier, preferably a functional rheology modifier, may be used to make the rheology-modified detergent particle according to a paste-agglomeration process. The paste-agglomeration process comprises the steps of: (a) adding powder raw ingredients into a mixer-granulator, where the powder raw ingredients may comprise one or more dry builder, buffer, dispersant polymer or chelant ingredient, necessary powder process aides, and fines recycled from the agglomeration process; (b) adding a paste comprising a premix of concentrated surfactant and functional rheology modifier; (c) of running the mixer-granulator to provide a suitable mixing flow field to disperse the paste with the powder and form agglomerates; optionally, (d) adding additional powder ingredients to at least partially coat the agglomerates, rendering their surface less sticky; (e) optionally drying the resultant agglomerates in a fluidized-bed dryer to remove excess moisture; (f) optionally cooling agglomerates in a fluidized bed cooler; (g) removing any excess fine particles from the agglomerate particle size distribution, preferably by elutriation from the fluidized beds of steps e and/or f, and recycling fines back to step a; (h) removing excess oversize particles from the agglomerate particle size distribution, preferably by screen classification; (i) grinding the oversize particles and recycling the ground particles to step a, e, or f. The paste-agglomeration process may be a batch process or a continuous process.

A variation of the above preferred embodiment may include addition of supplemental LAS cosurfactant in a stream that is separate from the pre-mixed surfactant paste of step (b). Process options include adding pre-neutralized LAS as a solid powder in step (a), adding a neutralized or partially-neutralized LAS paste as a supplement in step (b), or adding a liquid acid precursor (HLAS) as a supplement in step (b). In the latter cases, sufficient free alkalinity must be present in the powders added in step (a) to effectively neutralize the HLAS during the agglomeration process. Alternatively, HLAS neutralization may be done in a separate pre-processing step, first premixing HLAS with alkaline buffer powder ingredients and other optional solid carriers to form a neutralized pre-mix of LAS and alkaline buffer powder in a powder form, and then adding said premix in step (a) above.

As shown in the tables below, it has been surprisingly found that by adding LAS in particle form during the particle agglomeration process to a separate surfactant slurry, one can create a particle that has an LAS to AES ratio of greater than 1, such as, for example between 1.01 and 3.0, between 1.05 and 2.5, between 1.1 and 2.0, between 1.2 and 1.8. These particles are capable of achieving lower densities while increasing the amount of readily available LAS. As shown in the tables below, when combined with a web comprising LAS, the total product LAS to AES ratio can be greater than 1.0, such as, for example between 1.01 and 3.0, between 1.05 and 2.5, between 1.1 and 2.0, between 1.2 and 1.8.

Alternatively, a concentrated aqueous paste comprising a mixture of alkylalkoxylated sulfate anionic detersive surfactant and a rheology modifier, an extrusion process may be used. Extrusion processes are well known in the art.

Alternatively, the rheology modifier may be used as a binder in an agglomeration process to make the rheology modified detergent particle.

Surprisingly, the rheology-modified particle is finer and stronger, as compared to the same particle without a rheology modifier.

pH Adjusting Agent

The single unit dose may comprise one or more Base pH adjusting agents that increase the pH of the wash liquor to a pH greater than 8. Suitable Base pH adjusting agents include, without limitation, compounds that include sulfate ions, dihydrogen phosphate ions, fluoride ions, nitrite ions, acetate ions, hydrogen carbonate ions, hydrogen sulfide ions, ammonia, carbonate ions, hydroxide ions, and combinations thereof. The inclusion of Base pH adjusting agents does not preclude the inclusion of Acid pH adjusting agents such as, for example, citric acid. The single unit dose may include Acid pH adjusting agents provided that the wash liquor final pH is greater than 8, such as for example, 8.2, 8.4, 8.6, 8.8, 9, 9.2, 9.4, 9.6, 9.8, 10, 10.2, 10.4, 10.6, 10.8, 11, 11.2, 11.4, 11.6, 11.8, 12, 12.2, 12.4, 12.6, 12.8 or 13.

Concentrated Surfactant Paste

Concentrated surfactant pastes are intermediate compositions that may be combined with other ingredients to form a rheology modified particle. Concentrated surfactant compositions may comprise, may consist essentially of, or may consist of the following components: a surfactant system that may include an alkylalkoxylated sulfate surfactant; a rheology modifier, as described herein; an organic solvent system; and water. These components are described in more detail below.

The concentrated surfactant composition may comprise: from about 70% to about 90%, by weight of the composition, of a surfactant system, where the surfactant system comprises from about 50%, or from about 60%, or from about 70%, or from about 80%, to about 100%, of alkylalkoxylated sulfate surfactant; from about 0.1% to about 25%, by weight of the composition, of a rheology modifier; less than about 5%, by weight of the composition, of an organic solvent system; and water. The surfactant system of the paste preferably includes LAS co-surfactant. If LAS is included in the surfactant system, the ratio of LAS:AES may be from about 0 to about 1, preferably from about 0.2 to about 0.7, more preferably from about 0.25 to about 0.35, and even more preferably from 0.3 to about 0.6.

Solid carrier: Suitable solid carriers include inorganic salts, such as sodium carbonate, sodium sulfate and mixtures thereof. Other preferred solid carriers include aluminosilicates, such as zeolite, dried dispersant polymer in a fine powder form, and absorbent grades of fumed or precipitated silica (for example, precipitated hydrophilic silica commercialized by Evonik Industries AG under the trade name SN340). Mixtures of solid carrier materials may also be used.

Fibrous Structure

Fibrous structures comprise one or more fibrous elements. The fibrous elements can be associated with one another to form a structure. Fibrous structures can include particles within and or on the structure. Fibrous structures can be homogeneous, layered, unitary, zoned, or as otherwise desired, with different active agents defining the various aforesaid portions.

A fibrous structure can comprise one or more layers, the layers together forming a ply.

Fibrous Elements

The fibrous elements may be water-soluble. The fibrous elements may comprise one or more filament-forming materials and/or one or more active agents, such as a surfactant. The one or more active agents may be releasable from the fibrous element, such as when the fibrous element and/or fibrous structure comprising the fibrous element is exposed to conditions of intended use.

The fibrous elements of the present invention may be spun from a filament-forming composition, also referred to as fibrous element-forming compositions, via suitable spinning process operations, such as meltblowing, spunbonding, electro-spinning, and/or rotary spinning.

"Filament-forming composition" and/or "fibrous element-forming composition" as used herein means a composition that is suitable for making a fibrous element of the present invention such as by meltblowing and/or spunbonding. The filament-forming composition comprises one or more filament-forming materials that exhibit properties that make them suitable for spinning into a fibrous element. The filament-forming material may comprise a polymer. In addition to one or more filament-forming materials, the filament-forming composition may comprise one or more active agents, for example, a surfactant. In addition, the filament-forming composition may comprise one or more polar solvents, such as water, into which one or more, for example all, of the filament-forming materials and/or one or more, for example all, of the active agents are dissolved and/or dispersed prior to spinning a fibrous element, such as a filament from the filament-forming composition.

The filament-forming composition may comprise two or more different filament-forming materials. Thus, the fibrous elements may be monocomponent (one type of filament-forming material) and/or multicomponent, such as bicomponent. The two or more different filament-forming materials may be randomly combined to form a fibrous element. The two or more different filament-forming materials may be orderly combined to form a fibrous element, such as a core and sheath bicomponent fibrous element, which is not considered a random mixture of different filament-forming materials for purposes of the present disclosure. Bicomponent fibrous elements may be in any form, such as side-by-side, core and sheath, islands-in-the-sea and the like.

The fibrous elements may be substantially free of alkylalkoxylated sulfate. Each fibrous element may comprise from about 0%, or from about 0.1%, or from about 5%, or from about 10%, or from about 15% or from about 20%, or from about 25%, or from about 30%, or from about 35%, or from about 40% to about 0.2%, or to about 1%; or to about 5%, or to about 10%, or to about 15%, or to about 20%, or to about 25%, or to about 30%, or to about 35% or to about 40%, or to about 50% by weight on a dry fibrous element basis of an alkylalkoxylated sulfate. The amount of alkylalkoxylated sulfate in each of the fibrous elements is sufficiently small so as not to affect the processing stability and film dissolution thereof. Alkylalkoxylated sulfates, when dissolved in water, may undergo a highly viscous hexagonal phase at certain concentration ranges, e.g., 30-60% by weight, resulting in a gel-like sub stance. Therefore, if incorporated into the fibrous elements in a significant amount, alkylalkoxylated sulfates may significantly slow down the dissolution of the water-soluble unit dose articles in water, and worse yet, result in undissolved solids afterwards. Correspondingly, most of such surfactants are formulated into the particles.

The fibrous elements may each contain at least one filament-forming material and an active agent, preferably a surfactant. The surfactant may have a relatively low hydrophilicity, as such a surfactant is less likely to form a viscous, gel-like hexagonal phase when being diluted. By using such a surfactant in forming the filaments, gel-formation during wash may be effectively reduced, which in turn may result in faster dissolution and low or no residues in the wash. The surfactant can be selected, for example, from the group consisting of unalkoxylated C6-C20 linear or branched alkyl sulfates (AS), C6-C20 linear alkylbenzene sulfonates (LAS), and combinations thereof. The surfactant may be a C6-C20 linear alkylbenzene sulfonates (LAS). LAS surfactants are well known in the art and can be readily obtained by sulfonating commercially available linear alkylbenzenes. Exemplary $C_6$-$C_{20}$ linear alkylbenzene sulfonates that can be used include alkali metal, alkaline earth metal or ammonium salts of $C_6$-$C_{20}$ linear alkylbenzene sulfonic acids, such as the sodium, potassium, magnesium and/or ammonium salts of $C_{11}$-$C_{18}$ or $C_{11}$-$C_{14}$ linear alkylbenzene sulfonic acids. The sodium or potassium salts of $C_{12}$ linear alkylbenzene sulfonic acids, for example, the sodium salt of $C_{12}$ linear alkylbenzene sulfonic acid, i.e., sodium dodecylbenzene sulfonate, may be used as the first surfactant.

The fibrous element may comprise at least about 5%, and/or at least about 10%, and/or at least about 15%, and/or at least about 20%, and/or less than about 80%, and/or less than about 75%, and/or less than about 65%, and/or less than about 60%, and/or less than about 55%, and/or less than about 50%, and/or less than about 45%, and/or less than about 40%, and/or less than about 35%, and/or less than about 30%, and/or less than about 25% by weight on a dry fibrous element basis and/or dry fibrous structure basis of the filament-forming material and greater than about 20%, and/or at least about 35%, and/or at least about 40%, and/or at least about 45%, and/or at least about 50%, and/or at least about 55%, and/or at least about 60%, and/or at least about 65%, and/or at least about 70%, and/or less than about 95%, and/or less than about 90%, and/or less than about 85%, and/or less than about 80%, and/or less than about 75% by weight on a dry fibrous element basis and/or dry fibrous structure basis of an active agent, preferably surfactant. The fibrous element may comprise greater than about 80% by weight on a dry fibrous element basis and/or dry fibrous structure basis of surfactant.

Preferably, each fibrous element may be characterized by a sufficiently high total surfactant content, e.g., at least about 30%, or at least about 40%, or at least about 50%, or at least about 60%, or at least about 70%, by weight on a dry fibrous element basis and/or dry fibrous structure basis of the first surfactant.

The total level of filament-forming materials present in the fibrous element may be from about 5% to less than about 80% by weight on a dry fibrous element basis and/or dry fibrous structure basis and the total level of surfactant present in the fibrous element may be greater than about 20% to about 95% by weight on a dry fibrous element basis and/or dry fibrous structure basis.

One or more of the fibrous elements may comprise at least one additional surfactant selected from the group consisting of other anionic surfactants (i.e., other than AS and LAS), nonionic surfactants, zwitterionic surfactants, amphoteric surfactants, cationic surfactants, and combinations thereof.

Other suitable anionic surfactants include $C_6$-$C_{20}$ linear or branched alkyl sulfonates, $C_6$-$C_{20}$ linear or branched alkyl carboxylates, $C_6$-$C_{20}$ linear or branched alkyl phosphates, $C_6$-$C_{20}$ linear or branched alkyl phosphonates, $C_6$-$C_{20}$ alkyl N-methyl glucose amides, $C_6$-$C_{20}$ methyl ester sulfonates (MES), and combinations thereof.

Suitable nonionic surfactants include alkoxylated fatty alcohols. The nonionic surfactant may be selected from ethoxylated alcohols and ethoxylated alkyl phenols of the formula $R(OC_2H_4)_nOH$, wherein R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15. Non-limiting examples of nonionic surfactants useful herein include: $C_8$-$C_{18}$ alkylethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, BA; $C_{14}$-$C_{22}$ mid-chain branched alkylalkoxylates, $BAE_x$, wherein x is from 1 to 30; alkylpolysaccharides; specifically alkylpolyglycosides; polyhydroxy fatty acid amides; and ether capped poly(oxyalkylated) alcohol surfactants. Suitable nonionic detersive surfactants also include alkyl polyglucoside and alkylalkoxylated alcohol. Suitable nonionic surfactants also include those sold under the tradename Lutensol® from BASF.

Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, e.g., amido propyldimethyl amine (APA). Suitable cationic detersive surfactants also include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, for example chloride; sulfate; and sulfonate. Suitable cationic detersive surfactants are mono-$C_{6-18}$ alkyl mono-hydroxyethyl di-methyl quaternary ammonium chlorides. Highly suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Suitable examples of zwitterionic surfactants include: derivatives of secondary and tertiary amines, including derivatives of heterocyclic secondary and tertiary amines; derivatives of quaternary ammonium, quaternary phosphonium or tertiary sulfonium compounds; betaines, including alkyl dimethyl betaine, cocodimethyl amidopropyl betaine, and sulfo and hydroxy betaines; $C_8$ to $C_{18}$ (e.g., from $C_{12}$ to $C_{18}$) amine oxides; N-alkyl-N,N-dimethylamino-1-propane sulfonate, where the alkyl group can be $C_8$ to $C_{18}$.

Suitable amphoteric surfactants include aliphatic derivatives of secondary or tertiary amines, or aliphatic derivatives of heterocyclic secondary and tertiary amines in which the aliphatic radical may be straight or branched-chain and where one of the aliphatic substituents contains at least about 8 carbon atoms, or from about 8 to about 18 carbon atoms, and at least one of the aliphatic substituents contains an anionic water-solubilizing group, e.g. carboxy, sulfonate, sulfate. Suitable amphoteric surfactants also include sarcosinates, glycinates, taurinates, and mixtures thereof.

The fibrous elements may comprise a surfactant system containing only anionic surfactants, e.g., either a single anionic surfactant or a combination of two or more different anionic surfactants. Alternatively, the fibrous elements may include a composite surfactant system, e.g., containing a combination of one or more anionic surfactants with one or more nonionic surfactants, or a combination of one or more anionic surfactants with one or more zwitterionic surfactants, or a combination of one or more anionic surfactants with one or more amphoteric surfactants, or a combination of one or more anionic surfactants with one or more cationic surfactants, or a combination of all the above-mentioned types of surfactants (i.e., anionic, nonionic, amphoteric and cationic).

In general, fibrous elements are elongated particulates having a length greatly exceeding average diameter, e.g., a length to average diameter ratio of at least about 10. A fibrous element may be a filament or a fiber. Filaments are relatively longer than fibers. A filament may have a length of greater than or equal to about 5.08 cm (2 in.), and/or greater than or equal to about 7.62 cm (3 in.), and/or greater than or equal to about 10.16 cm (4 in.), and/or greater than or equal to about 15.24 cm (6 in.). A fiber may have a length of less than about 5.08 cm (2 in.), and/or less than about 3.81 cm (1.5 in.), and/or less than about 2.54 cm (1 in.).

The one or more filament-forming materials and active agents may be present in the fibrous element at a weight ratio of total level of filament-forming materials to active agents of about 2.0 or less, and/or about 1.85 or less, and/or less than about 1.7, and/or less than about 1.6, and/or less than about 1.5, and/or less than about 1.3, and/or less than about 1.2, and/or less than about 1, and/or less than about 0.7, and/or less than about 0.5, and/or less than about 0.4, and/or less than about 0.3, and/or greater than about 0.1, and/or greater than about 0.15, and/or greater than about 0.2. The one or more filament-forming materials and active agents may be present in the fibrous element at a weight ratio of total level of filament-forming materials to active agents of about 0.2 to about 0.7.

The fibrous element may comprise from about 10% to less than about 80% by weight on a dry fibrous element basis and/or dry fibrous structure basis of a filament-forming material, such as polyvinyl alcohol polymer, starch polymer, and/or carboxymethylcellulose polymer, and greater than about 20% to about 90% by weight on a dry fibrous element basis and/or dry fibrous structure basis of an active agent, such as surfactant. The fibrous element may further comprise a plasticizer, such as glycerin, and/or additional pH adjusting agents, such as citric acid. The fibrous element may have a weight ratio of filament-forming material to active agent of about 2.0 or less. The filament-forming material may be selected from the group consisting of polyvinyl alcohol, starch, carboxymethylcellulose, polyethylene oxide, and other suitable polymers, especially hydroxyl-containing polymers and their derivatives. The filament-forming material may range in weight average molecular weight from about 100,000 g/mol to about 3,000,000 g/mol. It is believed that in this range, the filament-forming material may provide extensional rheology, without being so elastic that fiber attenuation is inhibited in the fiber-making process.

The one or more active agents may be releasable and/or released when the fibrous element and/or fibrous structure comprising the fibrous element is exposed to conditions of intended use. The one or more active agents in the fibrous element may be selected from the group consisting of surfactants, organic polymeric compounds, and mixtures thereof.

The fibrous elements may exhibit a diameter of less than about 300 μm, and/or less than about 75 μm, and/or less than about 50 μm, and/or less than about 25 μm, and/or less than about 10 μm, and/or less than about 5 μm, and/or less than about 1 μm as measured according to the Diameter Test Method described herein. The fibrous elements may exhibit a diameter of greater than about 1 μm as measured according to the Diameter Test Method described herein. The diameter of a fibrous element may be used to control the rate of release of one or more active agents present in the fibrous element and/or the rate of loss and/or altering of the fibrous element's physical structure.

The fibrous element may comprise two or more different active agents, which are compatible or incompatible with one another. The fibrous element may comprise an active agent within the fibrous element and an active agent on an external surface of the fibrous element, such as an active agent coating on the fibrous element. The active agent on the external surface of the fibrous element may be the same or different from the active agent present in the fibrous element. If different, the active agents may be compatible or incompatible with one another. The one or more active agents may be uniformly distributed or substantially uniformly distributed throughout the fibrous element. The one or more active agents may be distributed as discrete regions within the fibrous element.

Active Agents

The water-soluble unit dose articles described herein may contain one or more active agents. The active agents may be present in the fibrous elements (as described above), in the particles (as described above), or as a premix in the article. Premixes for example, may be slurries of active agents that are combined with aqueous absorbents. The active agent may be selected from the group consisting of a surfactant, a structurant, a builder, an organic polymeric compound, an enzyme, an enzyme stabilizer, a bleach system, a brightener, a hueing agent, a chelating agent, a suds suppressor, a conditioning agent, a humectant, a perfume, a perfume microcapsule, a filler or carrier, an alkalinity system, a pH control system, a buffer, an alkanolamine, and mixtures thereof.

Surfactant

The surfactant may be selected from the group consisting of anionic surfactants, nonionic surfactants, cationic surfactants, zwitterionic surfactants, amphoteric surfactants, ampholytic surfactants, and mixtures thereof. These surfactants are described in more detail above.

Enzymes

Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof. A typical combination is an enzyme cocktail that may comprise, for example, a protease and one or more non-protease enzymes such as, for example, a lipase in conjunction with amylase or any of those listed above.

When present in a detergent composition, the aforementioned additional enzymes may be present at levels from about 0.00001% to about 2%, from about 0.0001% to about 1% or even from about 0.001% to about 0.5% enzyme protein by weight of the composition. The compositions disclosed herein may comprise from about 0.001% to about 1% by weight of an enzyme (as an adjunct), which may be selected from the group consisting of lipase, amylase, protease, mannanase, cellulase, pectinase, and mixtures thereof Proteases Preferably the enzyme composition comprises one or more proteases. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease.

Builders

Suitable builders include aluminosilicates (e.g., zeolite builders, such as zeolite A, zeolite P, and zeolite MAP), silicates, phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Alternatively, the composition may be substantially free of builder.

Polymeric Dispersing Agents

Suitable polymers include, but are not limited to, polymeric carboxylates, such as polyacrylates, poly acrylic-maleic co-polymers, and sulfonated modifications thereof, for example, a hydrophobically modified sulfonated acrylic acid copolymer. The polymer may be a cellulosic based polymer, a polyester, a polyterephthalate, a polyethylene glycol, an ethylene oxide-propylene oxide-ethylene oxide ($EOx_1POyEOx_2$) triblock copolymer, where each of $x_1$ and $x_2$ is in the range of about 2 to about 140 and y is in the range of from about 15 to about 70, a polyethyleneimine, any modified variant thereof, such as polyethylene glycol having grafted vinyl and/or alcohol moieties, and any combination thereof. In some cases, the dispersant polymer may also function as a rheology modifier, as described above.

Suitable polyethyleneimine polymers include propoxylated polyalkylenimine (e.g., PEI) polymers. The propoxylated polyalkylenimine (e.g., PEI) polymers may also be ethoxylated. The propoxylatedpolyalkylenimine (e.g., PEI) polymers may have inner polyethylene oxide blocks and outer polypropylene oxide blocks, the degree of ethoxylation and the degree of propoxylation not going above or below specific limiting values. The ratio of polyethylene blocks to polypropylene blocks (n/p) may be from about 0.6, or from about 0.8, or from about 1, to a maximum of about 10, or a maximum of about 5, or a maximum of about 3. The n/p ratio may be about 2. The propoxylated polyalkylenimines may have PEI backbones having weight average molecular weights (as determined prior to alkoxylation) of from about 200 g/mol to about 1200 g/mol, or from about 400 g/mol to about 800 g/mol, or about 600 g/mol. The molecular weight of the propoxylated polyalkylenimines may be from about 8,000 to about 20,000 g/mol, or from about 10,000 to about 15,000 g/mol, or about 12,000 g/mol.

Suitable propoxylated polyalkylenimine polymers may include compounds of the following structure:

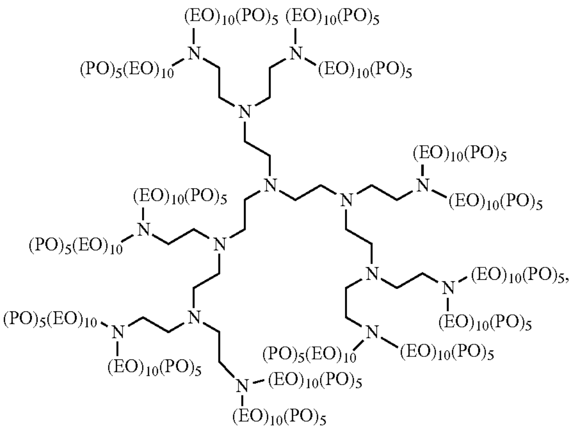

where EOs are ethoxylate groups and POs are propoxylate groups. The compound shown above is a PEI where the molar ratio of EO:PO is 10:5 (e.g., 2:1). Other similar, suitable compounds may include EO and PO groups present in a molar ratio of about 10:5 or about 24:16.

Soil Release Polymer

Suitable soil release polymers have a structure as defined by one of the following structures (I), (II) or (III):

$$—[(OCHR^1—CHR^2)_a—O—OC—Ar—CO—]_d \quad (I)$$

$$—[(OCHR^3—CHR^4)_b—O—OC\text{-}sAr—CO—]_e \quad (II)$$

$$—[(OCHR^5—CHR^6)_c—OR^7]_f \quad (III)$$

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are polyester soil release polymers such as Repel-o-tex polymers, including Repel-o-tex SF, SF-2 and SRP6 supplied by Rhodia. Other suitable soil release polymers include Texcare polymers, including Texcare SRA100, SRA300, SRN100, SRN170, SRN240, SRN300 and SRN325 supplied by Clariant. Other suitable soil release polymers are Marloquest polymers, such as Marloquest SL supplied by Sasol.

Cellulosic Polymer

Suitable cellulosic polymers including those selected from alkyl cellulose, alkyl alkoxyalkyl cellulose, carboxyalkyl cellulose, alkyl carboxyalkyl cellulose. The cellulosic polymers may be selected from the group consisting of carboxymethyl cellulose, methyl cellulose, methyl hydroxyethyl cellulose, methyl carboxymethyl cellulose, and mixtures thereof. In one aspect, the carboxymethyl cellulose has a degree of carboxymethyl substitution from 0.5 to 0.9 and a molecular weight from 100,000 Da to 300,000 Da.

Amines

Non-limiting examples of amines may include, but are not limited to, polyetheramines, polyamines, oligoamines, triamines, diamines, pentamines, tetraamines, or combinations thereof. Specific examples of suitable additional amines include tetraethylenepentamine, triethylenetetraamine, diethylenetriamine, or a mixture thereof.

Bleaching Agents

Suitable bleaching agents other than bleaching catalysts include photobleaches, bleach activators, hydrogen peroxide, sources of hydrogen peroxide, pre-formed peracids and mixtures thereof. In general, when a bleaching agent is used, the detergent compositions of the present invention may comprise from about 0.1% to about 50% or even from about 0.1% to about 25% bleaching agent by weight of the detergent composition.

Bleach Catalysts

Suitable bleach catalysts include, but are not limited to: iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and mixtures thereof Brighteners Commercial fluorescent brighteners suitable for the present disclosure can be classified into subgroups, including but not limited to: derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

The fluorescent brightener may be selected from the group consisting of disodium 4,4'-bis{[4-anilino-6-morpholino-s-triazin-2-yl]-amino}-2,2'-stilbenedisulfonate (brightener 15, commercially available under the tradename Tinopal AMS-GX by BASF), disodium4,4'-bis{[4-anilino-6-(N-2-bis-hydroxyethyl)-s-triazine-2-yl]-amino}-2,2'-stilbenedisulfonate (commercially available under the tradename Tinopal UNPA-GX by BASF), disodium 4,4'-bis{[4-anilino-6-(N-2-hydroxyethyl-N-methylamino)-s-triazine-2-yl]-amino}-2,2'-stilbenedisulfonate (commercially available under the tradename Tinopal SBM-GX by BASF). More preferably, the fluorescent brightener is disodium 4,4'-bis{[4-anilino-6-morpholino-s-triazin-2-yl]-amino}-2,2'-stilbenedisulfonate.

The brighteners may be added in particulate form or as a premix with a suitable solvent, for example nonionic surfactant, propanediol.

Fabric Hueing Agents

A fabric hueing agent (sometimes referred to as shading, bluing or whitening agents) typically provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Suitable fabric hueing agents include dyes, dye-clay conjugates, and organic and inorganic pigments. Suitable dyes also include small molecule dyes and polymeric dyes. Suitable small molecule dyes include small molecule dyes selected from the group consisting of dyes falling into the Color Index (C.I.) classifications of Direct, Basic, Reactive or hydrolysed Reactive, Solvent or Disperse dyes for example that are classified as Blue, Violet, Red, Green or Black, and provide the desired shade either alone or in combination. Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof. Suitable polymeric dyes also include polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. Suitable polymeric dyes also include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

The aforementioned fabric hueing agents can be used in combination (any mixture of fabric hueing agents can be used).

Encapsulates

An encapsulate may comprise a core, a shell having an inner and outer surface, said shell encapsulating said core. The core may comprise any laundry care adjunct, though typically the core may comprise material selected from the group consisting of perfumes; brighteners; hueing dyes; insect repellants; silicones; waxes; flavors; vitamins; fabric softening agents; skin care agents in one aspect, paraffins; enzymes; anti-bacterial agents; bleaches; sensates; and mixtures thereof; and said shell may comprise a material selected from the group consisting of polyethylenes; polyamides; polyvinylalcohols, optionally containing other co-monomers; polystyrenes; polyisoprenes; polycarbonates; polyesters; polyacrylates; aminoplasts, in one aspect said aminoplast may comprise a polyureas, polyurethane, and/or polyureaurethane, in one aspect said polyurea may comprise polyoxymethyleneurea and/or melamine formaldehyde; polyolefins; polysaccharides, in one aspect said polysaccharide may comprise alginate and/or chitosan; gelatin; shellac;

epoxy resins; vinyl polymers; water insoluble inorganics; silicone; and mixtures thereof.

Preferred encapsulates comprise perfume. Preferred encapsulates comprise a shell which may comprise melamine formaldehyde and/or cross linked melamine formaldehyde. Other preferred capsules comprise a polyacrylate based shell. Preferred encapsulates comprise a core material and a shell, said shell at least partially surrounding said core material, is disclosed. At least 75%, 85% or even 90% of said encapsulates may have a fracture strength of from 0.2 MPa to 10 MPa, and a benefit agent leakage of from 0% to 20%, or even less than 10% or 5% based on total initial encapsulated benefit agent. Preferred are those in which at least 75%, 85% or even 90% of said encapsulates may have (i) a particle size of from 1 microns to 80 microns, 5 microns to 60 microns, from 10 microns to 50 microns, or even from 15 microns to 40 microns, and/or (ii) at least 75%, 85% or even 90% of said encapsulates may have a particle wall thickness of from 30 nm to 250 nm, from 80 nm to 180 nm, or even from 100 nm to 160 nm. Formaldehyde scavengers may be employed with the encapsulates, for example, in a capsule slurry and/or added to a composition before, during or after the encapsulates are added to such composition.

Suitable capsules that can be made using known processes. Alternatively, suitable capsules can be purchased from Encapsys LLC of Appleton, Wis. USA. In a preferred aspect the composition may comprise a deposition aid, preferably in addition to encapsulates. Preferred deposition aids are selected from the group consisting of cationic and nonionic polymers. Suitable polymers include cationic starches, cationic hydroxyethylcellulose, polyvinylformaldehyde, locust bean gum, mannans, xyloglucans, tamarind gum, polyethyleneterephthalate and polymers containing dimethylaminoethyl methacrylate, optionally with one or more monomers selected from the group comprising acrylic acid and acrylamide.

Perfumes

Non-limiting examples of perfume and perfumery ingredients include, but are not limited to, aldehydes, ketones, esters, and the like. Other examples include various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes can comprise extremely complex mixtures of such ingredients. Finished perfumes may be included at a concentration ranging from about 0.01% to about 2% by weight of the detergent composition.

Dye Transfer Inhibiting Agents

Dye transfer inhibiting agents are effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, and in other examples, from about 0.05% to about 2% by weight of the composition.

Chelating Agents

Suitable chelating agents include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins and mixtures thereof. Chelating agents can be present in the acid or salt form including alkali metal, ammonium, and substituted ammonium salts thereof, and mixtures thereof. Other suitable chelating agents for use herein are the commercial DEQUEST series, and chelants from Monsanto, Akzo-Nobel, DuPont, Dow, the Trilon® series from BASF and Nalco, copolymers of maleic and acrylic acid available from BASF, DOW, and Nippon Shokubai.

Suds Suppressors

Compounds for reducing or suppressing the formation of suds can be incorporated into the water-soluble unit dose articles. Suds suppression can be of particular importance in the so-called "high concentration cleaning process" and in front-loading style washing machines. Examples of suds supressors include monocarboxylic fatty acid and soluble salts therein, high molecular weight hydrocarbons such as paraffin, fatty acid esters (e.g., fatty acid triglycerides), fatty acid esters of monovalent alcohols, aliphatic $C_{18}$-$C_{40}$ ketones (e.g., stearone), N-alkylated amino triazines, waxy hydrocarbons preferably having a melting point below about 100° C., silicone suds suppressors, and secondary alcohols.

Additional suitable antifoams are those derived from phenylpropylmethyl substituted polysiloxanes.

The detergent composition may comprise a suds suppressor selected from organomodified silicone polymers with aryl or alkylaryl substituents combined with silicone resin and a primary filler, which is modified silica. The detergent compositions may comprise from about 0.001% to about 4.0%, by weight of the composition, of such a suds suppressor.

The detergent composition comprises a suds suppressor selected from: a) mixtures of from about 80 to about 92% ethylmethyl, methyl(2-phenylpropyl) siloxane; from about 5 to about 14% MQ resin in octyl stearate; and from about 3 to about 7% modified silica; b) mixtures of from about 78 to about 92% ethylmethyl, methyl(2-phenylpropyl) siloxane; from about 3 to about 10% MQ resin in octyl stearate; from about 4 to about 12% modified silica; or c) mixtures thereof, where the percentages are by weight of the anti-foam.

Suds Boosters

If high sudsing is desired, suds boosters such as the $C_{10}$-$C_{16}$ alkanolamides may be used. Some examples include the $C_{10}$-$C_{14}$ monoethanol and diethanol amides. If desired, water-soluble magnesium and/or calcium salts such as $MgCl_2$, $MgSO_4$, $CaCl_2$, $CaSO_4$, and the like, may be added at levels of about 0.1% to about 2% by weight of the detergent composition, to provide additional suds and to enhance grease removal performance.

Conditioning Agents

Suitable conditioning agents include high melting point fatty compounds. The high melting point fatty compound useful herein has a melting point of 25° C. or higher, and is selected from the group consisting of fatty alcohols, fatty acids, fatty alcohol derivatives, fatty acid derivatives, and mixtures thereof. Suitable conditioning agents also include nonionic polymers and conditioning oils, such as hydrocarbon oils, polyolefins, and fatty esters.

Suitable conditioning agents include those conditioning agents characterized generally as silicones (e.g., silicone oils, polyoils, cationic silicones, silicone gums, high refractive silicones, and silicone resins), organic conditioning oils (e.g., hydrocarbon oils, polyolefins, and fatty esters) or combinations thereof, or those conditioning agents which otherwise form liquid, dispersed particles in the aqueous surfactant matrix herein.

Fabric Enhancement Polymers

Suitable fabric enhancement polymers are typically cationically charged and/or have a high molecular weight. The fabric enhancement polymers may be a homopolymer or be formed from two or more types of monomers. The monomer weight of the polymer will generally be between 5,000 and 10,000,000, typically at least 10,000 and preferably in the range 100,000 to 2,000,000. Preferred fabric enhancement polymers will have cationic charge densities of at least 0.2 meq/gm, preferably at least 0.25 meq/gm, more preferably at least 0.3 meq/gm, but also preferably less than 5 meq/gm, more preferably less than 3 meq/gm, and most preferably less than 2 meq/gm at the pH of intended use of the composition, which pH will generally range from pH 3 to pH 9, preferably between pH 4 and pH 8. The fabric enhancement polymers may be of natural or synthetic origin.

Pearlescent Agent

Non-limiting examples of pearlescent agents include: mica; titanium dioxide coated mica; bismuth oxychloride; fish scales; mono and diesters of alkylene glycol. The pearlescent agent may be ethyleneglycoldistearate (EGDS).

Hygiene and Malodor

Suitable hygiene and malodor active agents include zinc ricinoleate, thymol, quaternary ammonium salts such as Bardac®, polyethylenimines (such as Lupasol® from BASF) and zinc complexes thereof, silver and silver compounds, especially those designed to slowly release $Ag^+$ or nano-silver dispersions.

Buffer System

The water-soluble unit dose articles described herein may be formulated such that, during use in aqueous cleaning operations, the wash water will have a pH of between about 7.0 and about 12, and in some examples, between about 7.0 and about 11. Techniques for controlling pH at recommended usage levels include the use of buffers, alkalis, or acids, and are well known to those skilled in the art. These include, but are not limited to, the use of sodium carbonate, citric acid or sodium citrate, lactic acid or lactate, monoethanol amine or other amines, boric acid or borates, and other pH-adjusting compounds well known in the art.

The detergent compositions herein may comprise dynamic in-wash pH profiles. Such detergent compositions may use wax-covered citric acid particles in conjunction with other pH control agents such that (i) about 3 minutes after contact with water, the pH of the wash liquor is greater than 10; (ii) about 10 minutes after contact with water, the pH of the wash liquor is less than 9.5; (iii) about 20 minutes after contact with water, the pH of the wash liquor is less than 9.0; and (iv) optionally, wherein, the equilibrium pH of the wash liquor is in the range of from about 7.0 to about 8.5.

Method for Making

Figure 3:
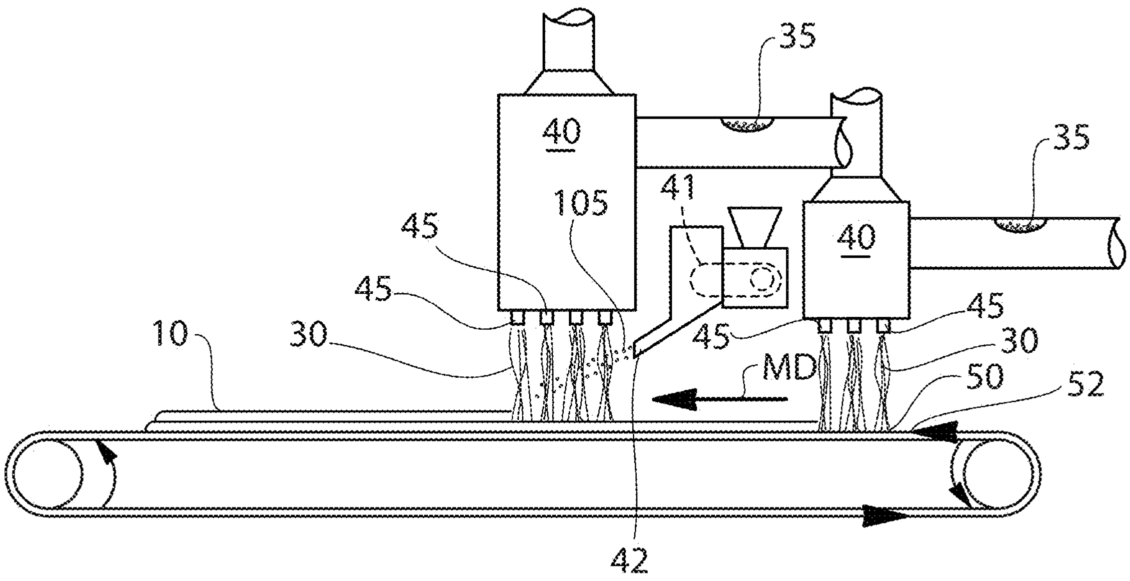
FIG. 3 is a process for making plies of a material.
Figure 4:
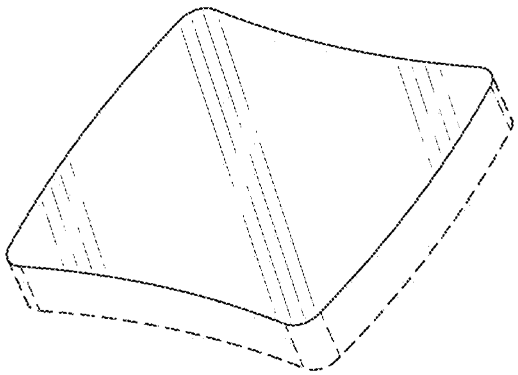
FIG. 4 is a perspective view of an embodiment of a SINGLE-DOSE LAUNDRY DETERGENT UNIT embodying a new design.
Figure 5:
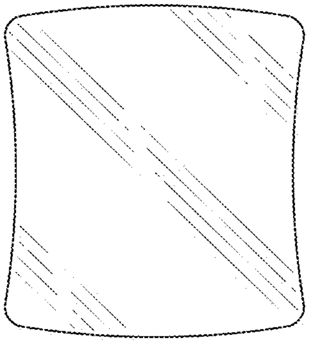
FIG. 5 is a front view of the SINGLE-DOSE LAUNDRY DETERGENT UNIT of FIG. 4.

As exemplified by illustration in FIG. 3, a solution of a filament forming composition 35 is provided. The filament forming composition can comprise one or more filament forming materials and optionally one or more active agents. The filament forming composition 35 is passed through one or more die block assemblies 40 comprising a plurality of spinnerets 45 to form a plurality of fibrous elements 30 comprising the one or more filament forming materials and optionally one or more active agents. Multiple die block assemblies 40 can be employed to spin different layers of fibrous elements 30, with the fibrous elements 30 of different layers having a composition that differ from one another or are the same as one another. More than two die block assemblies in series can be provided to form three, four, or any other integer number of layers in a given ply. The fibrous elements 30 can be deposited on a belt 50 moving in a machine direction MD to forma first ply 10.

Particles can be introduced into the stream of the fibrous elements 30 between the die block assembly 40 and the belt 50. Particles can be fed from a particle receiver onto a belt feeder 41 or optionally a screw feeder. The belt feeder 41 can be set and controlled to deliver the desired mass of particles into the process. The belt feeder can feed an air knife 42 that suspends and directs the particles in an air stream into the fibrous elements 30 to form a particle-fiber layer of comingled fibrous elements 30 and particles that is subsequently deposited on the belt 50.

To form the water-soluble product, a first ply 10 can be provided. A second ply 15 can be provided separate from the first ply 10. The first ply 10 and the second ply 15 are superposed with one another. By superposed it is meant that one is positioned above or below the other with the proviso that additional plies or other materials, for example active agents, may be positioned between the superposed plies. A portion of the first ply 10 can be joined to a portion of the second ply 15 to form the water-soluble product 5. Each ply may comprise one or more layers.

Particle-Fiber Layer

A particle-fiber layer may be arranged in several ways. Clusters of particles may be distributed in pockets distributed in the layer, where such pockets may be formed between layers of fibrous elements; the contact network and porosity within each cluster of particles is governed by physics of conventional particle packing, yet the clusters are substantially dilated in the layer. The particles may be distributed relatively homogeneously throughout the fibrous structure, substantially free of local particle clusters; packing is substantially dilated on the scale of individual particles, with fewer inter-particle contacts and greater interparticle porosity. Without wishing to be bound by theory, it is believed that a water-soluble unit dose article comprising a layer comprising fibrous elements and particles, where sticky surfactants, such as AES, are segregated into particles having a dilated structure, provides for an improvement in dispersion and dissolution of the unit dose article, both by faster imbibition of water into the dilated structure and by a reduction in contacts among particles having sticky surfactants.

Pouches. The single unit dose may be in the form of a pouch. The composition may be provided in the form of a unitized dose, either tablet form or preferably in the form of a liquid/solid (optionally granules)/gel/paste held within a water-soluble film in what is known as a pouch or pod. The composition can be encapsulated in a single or multi-compartment pouch. Multi-compartment pouches are described in more detail in EP-A-2133410. Shading or non-shading dyes or pigments or other aesthetics may also be used in one or more compartments.

Suitable film for forming the pouches is soluble or dispersible in water, and preferably has a water-solubility/dispersibility of at least 50%, preferably at least 75% or even at least 95%, as measured by the method set out here after using a glass-filter with a maximum pore size of 20 microns:

50 grams±0.1 gram of pouch material is added in a pre-weighed 400 ml beaker and 245 ml±1 ml of distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated. Preferred film materials are polymeric materials. The film material can be obtained, for example, by casting, blow-moulding, extrusion or blown extrusion of the polymeric material, as known in the art. Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000. Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000. Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol. Preferred for use herein are polymers which are from about 60% to about 98% hydrolysed, preferably about 80% to about 90% hydrolysed, to improve the dissolution characteristics of the material.

Naturally, different film material and/or films of different thickness may be employed in making the compartments of the present invention. A benefit in selecting different films is that the resulting compartments may exhibit different solubility or release characteristics.

Most preferred film materials are PVA films known under the MonoSol trade reference M8630, M8900, H8779 (as described in the Applicants co-pending applications ref 44528 and 11599) and those described in U.S. Pat. Nos. 6,166,117 and 6,787,512 and PVA films of corresponding solubility and deformability characteristics.

The film material herein can also comprise one or more additive ingredients. For example, it can be beneficial to add plasticisers, for example glycerol, ethylene glycol, diethyleneglycol, propylene glycol, sorbitol and mixtures thereof. Other additives include functional detergent additives to be delivered to the wash water, for example organic polymeric dispersants, etc.

Bittering agent may be incorporated into a pouch or pod, either by incorporation in the composition inside the pouch, and/or by coating onto the film.

Method of Laundering

The present invention also encompasses a method of laundering using an article according to the present invention, comprising the steps of, placing at least one article according to the present invention into the washing machine along with the laundry to be washed, and carrying out a washing or cleaning operation. Specifically, the method may include obtaining a fabric having a sebum deposited thereon, treating the fabric in a wash step, wherein the wash step includes contacting the fabric with a wash liquor. Wherein the wash liquor is prepared by diluting a water-soluble unit dose in water by between 300 and 800 fold, preferably between 400 and 700 fold; wherein the wash liquor consists of a pH greater than or equal to 8.

Any suitable washing machine may be used. Examples include an automatic washing machine, a manual wash operation or a mixture thereof, preferably an automatic washing machine.

Those skilled in the art will recognize suitable machines for the relevant wash operation. The article of the present invention may be used in combination with other compositions, such as fabric additives, fabric softeners, rinse aids and the like.

The wash temperature may be between 5° C. and 90° C., such as, for example, 30° C. or less. The wash process may comprise at least one wash cycle having a duration of between 5 and 50 minutes. The automatic laundry machine may comprise a rotating drum, and wherein during at least one wash cycle, the drum has a rotational speed of between 15 and 40 rpm, preferably between 20 and 35 rpm.

The fabric may be cotton, polyester, cotton/polyester blends or a mixture thereof, preferably cotton.

The water-soluble unit dose article comprising a water-soluble fibrous structure and one or more rheology-modified particles distributed throughout the structure may remove one or more types of stains such as, for example, butter, beef, grass, tea, spaghetti, sebum, wine, and any other type of stain which may be imparted on a fabric.

Test Methods

Basis Weight Test Method

Basis weight of a fibrous structure is measured on stacks of twelve usable units using a top loading analytical balance with a resolution of ±0.001 g. The balance is protected from air drafts and other disturbances using a draft shield. A precision cutting die, measuring 3.500 in ±0.0035 in by 3.500 in ±0.0035 in is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in lbs/3000 $ft^2$ or $g/m^2$ as follows:

Basis Weight=(Mass of stack)/[(Area of 1 square in stack)×(No. of squares in stack)]

For example, $$\text{Basis Weight (lbs/3000 ft}^2\text{)}=[[\text{Mass of stack (g)}/453.6\ \text{(g/lbs)}]/[12.25\ \text{(in}^2\text{)}/144\ \text{(in}^2\text{/ft}^2\text{)}\times 12]]\times 3000$$

or, $$\text{Basis Weight (g/m}^2\text{)}=\text{Mass of stack (g)}/[79.032\ \text{(cm}^2\text{)}/10{,}000\ \text{(cm}^2\text{/m}^2\text{)}\times 12]$$

Report result to the nearest 0.1 lbs/3000 $ft^2$ or 0.1 $g/m^2$. Sample dimensions can be changed or varied using a similar precision cutter as mentioned above, so as at least 100 square inches of sample area in stack.

Thickness Test Method

Thickness of a fibrous structure is measured by cutting 5 samples of a fibrous structure sample such that each cut sample is larger in size than a load foot loading surface of a VIR Electronic Thickness Tester Model II available from Thwing-Albert Instrument Company, Philadelphia, PA. Typically, the load foot loading surface has a circular surface area of about 3.14 $in^2$. The sample is confined between a horizontal flat surface and the load foot loading surface. The load foot loading surface applies a confining pressure to the sample of 15.5 $g/cm^2$. The thickness of each sample is the resulting gap between the flat surface and the load foot loading surface. The thickness is calculated as the average thickness of the five samples. The result is reported in millimeters (mm).

Granular Size Distribution Test Method

The granular size distribution test is conducted to determine characteristic sizes of particles. It is conducted using ASTM D 502-89, "Standard Test Method for Particle Size of Soaps and Other Detergents", approved May 26, 1989, with a further specification for sieve sizes and sieve time used in the analysis. Following section 7, "Procedure using machine-sieving method," a nest of clean dry sieves containing U.S. Standard (ASTM E 11) sieves #4 (4.75 mm), #6 (3.35 mm), #8 (2.36 mm), #12 (1.7 mm), #16 (1.18 mm), #20 (850 um), #30 (600 um), #40 (425 um), #50 (300 um), #70 (212 um), #100 (150 um) is required to cover the range of particle sizes referenced herein. The prescribed Machine-Sieving Method is used with the above sieve nest. A suitable sieve-shaking machine can be obtained from W. S. Tyler Company, Ohio, U.S.A. The sieve-shaking test sample is approximately 100 grams and is shaken for 5 minutes.

The data are plotted on a semi-log plot with the micron size opening of each sieve plotted against the logarithmic abscissa and the cumulative mass percent ($Q_3$) plotted against the linear ordinate. An example of the above data representation is given in ISO 9276-1:1998, "Representation of results of particle size analysis—Part 1: Graphical Representation", FIG. A.4. A characteristic particle size (Dx), for the purpose of this invention, is defined as the abscissa value at the point where the cumulative mass percent is equal to x percent, and is calculated by a straight line interpolation between the data points directly above (a) and below (b) the x % value using the following equation:

$$Dx=10\hat{}[\text{Log}(Da)-(\text{Log}(Da)-\text{Log}(Db))*(Qa-x\%)/(Qa-Qb)]$$

where Log is the base-10 logarithm, Qa and Qb are the cumulative mass percentile values of the measured data immediately above and below the $x^{th}$ percentile, respectively; and Da and Db are the micron sieve size values corresponding to these data.

Example Data and Calculations:

| sieve size (um) | weight on sieve (g) | cumulative mass % finer (CMPF) |
|---|---|---|
| 4750 | 0 | 100% |
| 3350 | 0 | 100% |
| 2360 | 0 | 100% |
| 1700 | 0 | 100% |
| 1180 | 0.68 | 99.3% |
| 850 | 10.40 | 89.0% |
| 600 | 28.73 | 60.3% |
| 425 | 27.97 | 32.4% |
| 300 | 17.20 | 15.2% |
| 212 | 8.42 | 6.8% |
| 150 | 4.00 | 2.8% |
| pan | 2.84 | 0.0% |

For D10 (x=10%), the micron screen size where CMPF is immediately above 10% (Da) is 300 um, the screen below (Db) is 212 um. The cumulative mass immediately above 10% (Qa) is 15.2%, below (Qb) is 6.8%.

$$D10=10\hat{}[\text{Log}(300)-(\text{Log}(300)-\text{Log}(212))*(15.2\%-10\%)/(15.2\%-6.8\%)]=242\ \text{um}$$

For D50 (x=50%), the micron screen size where CMPF is immediately above 50% (Da) is 1180 um, the screen below (Db) is 850 um. The cumulative mass immediately above 90% (Qa) is 99.3%, below (Qb) is 89.0%.

$$D50=10\hat{}[\text{Log}(600)-(\text{Log}(600)-\text{Log}(425))*(60.3\%-50\%)/(60.3\%-32.4\%)]=528\ \text{um}$$

For D90 (x=90%), the micron screen size where CMPF is immediately above 90% (Da) is 600 um, the screen below (Db) is 425 um. The cumulative mass immediately above 50% (Qa) is 60.3%, below (Qb) is 32.4%.

$$D90=10\hat{}[\text{Log}(1180)-(\text{Log}(1180)-\text{Log}(850))*(99.3\%-90\%)/(99.3\%-89.0\%)]=878\ \text{um}$$

Diameter Test Method

The diameter of a discrete fibrous element or a fibrous element within a fibrous structure is determined by using a Scanning Electron Microscope (SEM) or an Optical Microscope and an image analysis software. A magnification of 200 to 10,000 times is chosen such that the fibrous elements are suitably enlarged for measurement. When using the SEM, the samples are sputtered with gold or a palladium compound to avoid electric charging and vibrations of the fibrous element in the electron beam. A manual procedure for determining the fibrous element diameters is used from the image (on monitor screen) taken with the SEM or the optical microscope. Using a mouse and a cursor tool, the edge of a randomly selected fibrous element is sought and then measured across its width (i.e., perpendicular to fibrous element direction at that point) to the other edge of the fibrous element. A scaled and calibrated image analysis tool provides the scaling to get actual reading in μm. For fibrous elements within a fibrous structure, several fibrous element are randomly selected across the sample of the fibrous structure using the SEM or the optical microscope. At least two portions of the fibrous structure are cut and tested in this manner. Altogether at least 100 such measurements are made and then all data are recorded for statistical analysis. The recorded data are used to calculate average (mean) of the fibrous element diameters, standard deviation of the fibrous element diameters, and median of the fibrous element diameters.

Another useful statistic is the calculation of the amount of the population of fibrous elements that is below a certain upper limit. To determine this statistic, the software is programmed to count how many results of the fibrous element diameters are below an upper limit and that count (divided by total number of data and multiplied by 100%) is reported in percent as percent below the upper limit, such as percent below 1 micrometer diameter or %-submicron, for example. We denote the measured diameter (in μm) of an individual circular fibrous element as di.

In the case that the fibrous elements have non-circular cross-sections, the measurement of the fibrous element diameter is determined as and set equal to the hydraulic diameter which is four times the cross-sectional area of the fibrous element divided by the perimeter of the cross-section of the fibrous element (outer perimeter in case of hollow fibrous elements). The number-average diameter, alternatively average diameter is calculated as:

$$d_{num} = \frac{\sum_{i=1}^{n} d_i}{n}$$

MicroCT Methods for QB02625

Samples to be tested are imaged using a microCT X-ray scanning instrument capable of acquiring a dataset at an isotropic spatial resolution of 7 μm. One example of suitable instrumentation is the SCANCO system model 50 microCT scanner (Scanco Medical AG, Brüttisellen, Switzerland) operated with the following settings: energy level of 45 kVp at 133 μA; 3000 projections; 35 mm field of view; 750 ms integration time; an averaging of 4; and a voxel size of 7 μm.

Test samples to be analyzed are prepared by cutting a line from one sealed edge to the other to form a triangle approx. 20 mm below the tip where the two intact sealed edges meet and the resulting cut face is approx. 28 mm in length. The prepared samples are laid flat between annuli of a low-attenuating sample preparation mounting foam, in alternating layers and mounted in a 35 mm diameter plastic cylindrical tube for scanning. Scans of the samples are acquired such that the entire volume of all the mounted cut sample is included in the dataset.

In order to reliably and repeatedly measure the volume percentage of fibers, particles and void space within the sample, a small subvolume of the sample is extracted from the cross section of the product that creates a 3D slab of data, where the particles, fibers and void spaces can be qualitatively assessed. A mask that encompasses this volume of data is created. The mask should not contain void elements exterior to the product which would bias the void volume measurement. In addition, the region of the product which is chosen for analysis is based on fixed distances from physical landmarks on the product.

In order to separate the interior of the volume into three regions: 1) Particles 2) Fibers and 3) Void space, an automated thresholding algorithm is utilized which provides optimal separation of these three regions. Since the particles are higher density than the fibers, an additional step of a slight dilation of the segmented particles should also be performed. This will allow for the expected partial volume averaging at the surface of the particles to be accounted for. The dilated segmented particles can then have their total volume calculated. A lower threshold is then used to separate the fibers from the air. The fiber volume is the intersection of those voxels above the lower threshold and not part of the particle region. Lastly the void volume is then found by subtracting the overall mask volume from the union of the fiber and particle volumes.

One implementation of this is done through the use of two software platforms: Avizo 9.2.0 and Matlab R2016b, both running on Windows 64 bit workstation. In this case the data was collected from a Scanco mCT50 3D x-ray microCT scanner, collecting data at a resolution of 7 micron voxels. After the scanning and imaging reconstruction is complete, the scanner creates a 16 bit data set, referred to as an ISQ file, where grey levels reflect changes in x-ray attenuation, which in turn relates to material density. In this case, the ISQ is quite large with dimensions of 5038×5038×1326.

The ISQ file is read into Avizo 9.2.0. It is converted to 8 bit using a scaling factor of 0.15. A sub-volume is chosen that is diagonal to one corner offset by 11 mm. A slab of thickness 3.5 mm is chosen for analysis.

In order to apply a robust automated thresholding scheme, a cross sectional slice from each of the three samples is read into Matlab R2016B. A function called 'multithresh( )' is then used to divide the segment into N different regions, where in this example N=2. This function is based on a well-known algorithm called 'Otsu's Method', which provides optimal segmentation based on the distribution of the image histogram. The average values of these thresholds across the three samples was then chosen. In this example, the threshold separating particles from fibers was 124 and the threshold separating fibers from air was 48. An additional dilation using a spherical structuring element of Radius 1 is used on the segmented particle data to compensate for partial volume averaging. The histogram function in Avizo then allows for the calculation of total volume associated for the fibers and particles and the total mask volume. The void volume is then found from the subtraction of fiber and particle volume from the total mask volume. These results can then be transferred into Excel for further analysis or visualization.

Particle Size Density:

The Particle Size Density test is used to measure the density of synthetic granular detergents. Preparation of Samples Grams per liter cup density are measured on product which is at room temperature. Two or more cartons may be needed to conduct the test for small size packaging The table below denotes the preferred sampling for different sized cartons.

| Container size g | Sampling technique | Reporting |
|---|---|---|
| >2000 g | Grab sample from top, middle, and bottom. | Report average |
| >400 g | Grab sample from container | Report result |
| <400 g | Open sufficient samples to obtain required to fill density cup | Report result |

To run the test, one should tare a liter cup. Then plug the opening in the bottom of a funnel and pour room temperature sample into the funnel (approximately % full). Sufficient sample should be used to fill the cup to overflowing. Next, set the cup on the positioning stand directly under the center of the funnel. Release the plug and make sure the sample flows freely into the cup. Scrape the cup so that it is full and level. Be very careful not to vibrate or tap the cup prior to scraping. Last, weigh the cup and contents. The Density (grams per liter) is equal to the Net Weight (g) in the cup.

Wash Residue Test Method

The Wash Residue Test qualitatively measures detergent residues on fabrics. Each test includes four comparative product samples and each product sample has four repetitions. The test uses a Whirlpool Duet washing machine (Model #WFW 9200 SQO2) connected with a water temperature control system set to 50° F.+/−1° F.

Black velvet pouches are supplied from Equest U.K. tel. (01207) 529920.

1. Material source: Denholme Velvets, Halifax Road, Denholme, Bradford, West Yorkshire, England BD13 4EZ—tel. (01274) 832 646.
2. Material type: 150 cm C.R. Cotton Pile Velvet, quality 8897, black, 72% Cotton, 28% Modal.
3. Sewing instructions for Equest: A rectangle of black velvet of 23.5 cm×47 cm is cut. The rectangle of black velvet is folded to make a square with the velvet on the inside. An overlock stitch is used and the square is sewn along two sides leaving one open edge. A blank identification label (flat cotton of 3×3 cm) is sewn into one side.

Test Preparation:

1. The pouch is turned inside out so that the velvet is on the outside with one open edge.
2. The product code and internal/external replicates are written in permanent marker on the identification label.
3. The recommended dosage for the water-soluble unit dose product for normal/median soil and normal/median water hardness is placed in the right back corner of the black velvet pouch.
4. The open end of the black pouch is folded with a seam of 2 cm and closed up with stitches in the middle of the 2 cm width seam along the whole length of the opening.
5. These steps are repeated to have 4 replicates per test product in total.
6. The black pouch is placed in the washing machine and washed as follows.

Figure 6:
FIG. 6 is a right view of the SINGLE-DOSE LAUNDRY DETERGENT UNIT of FIG. 4.
Figure 7:
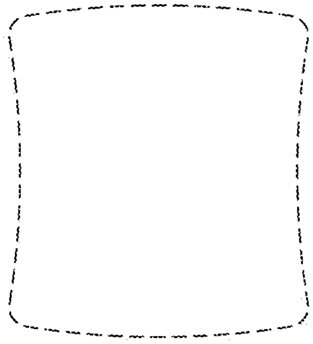
FIG. 7 is a back view of the SINGLE-DOSE LAUNDRY DETERGENT UNIT of FIG. 4.
Figure 8:
FIG. 8 is a left view of the SINGLE-DOSE LAUNDRY DETERGENT UNIT of FIG. 4.
Figure 9:
FIG. 9 is a bottom view of the SINGLE-DOSE LAUNDRY DETERGENT UNIT of FIG. 4.
Figure 10:
FIG. 10 is a top view of the SINGLE-DOSE LAUNDRY DETERGENT UNIT of FIG. 4.
Figure 11:
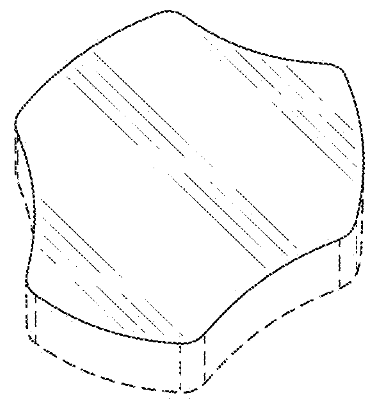
FIG. 11 is a perspective view of an embodiment of a SINGLE-DOSE LAUNDRY DETERGENT UNIT embodying a new design.
Figure 12:
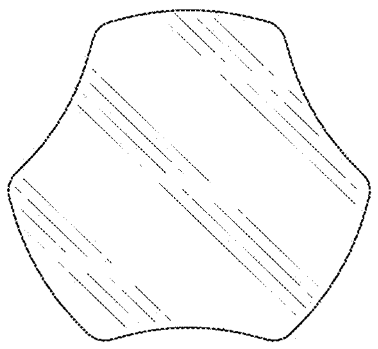
FIG. 12 is a front view of the SINGLE-DOSE LAUNDRY DETERGENT UNIT of FIG. 11.
Figure 13:
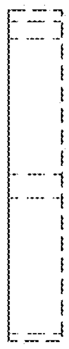
FIG. 13 is a right view of the SINGLE-DOSE LAUNDRY DETERGENT UNIT of FIG. 11.
Figure 14:
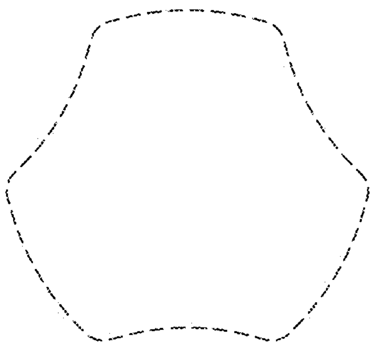
FIG. 14 is a back view of the SINGLE-DOSE LAUNDRY DETERGENT UNIT of FIG. 11.
Figure 15:
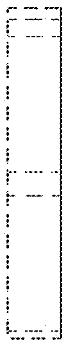
FIG. 15 is a left view of the SINGLE-DOSE LAUNDRY DETERGENT UNIT of FIG. 11.
Figure 16:
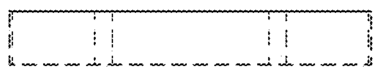
FIG. 16 is a bottom view of the SINGLE-DOSE LAUNDRY DETERGENT UNIT of FIG. 11.
Figure 17:
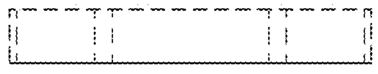
FIG. 17 is a top view of the SINGLE-DOSE LAUNDRY DETERGENT UNIT of FIG. 11.
Figure 18:
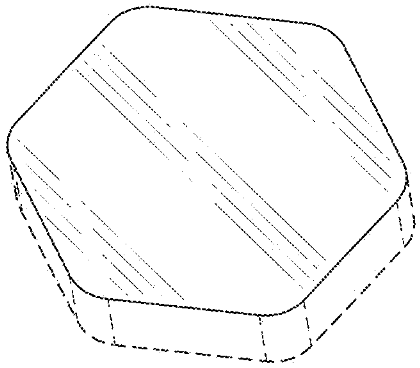
FIG. 18 is a perspective view of an embodiment of a SINGLE-DOSE LAUNDRY DETERGENT UNIT embodying a new design.
Figure 19:
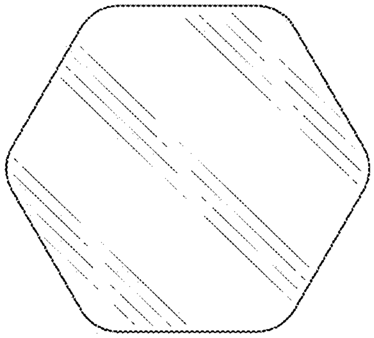
FIG. 19 is a front view of the SINGLE-DOSE LAUNDRY DETERGENT UNIT of FIG. 18.
Figure 20:
FIG. 20 is a right view of the SINGLE-DOSE LAUNDRY DETERGENT UNIT of FIG. 18.
Figure 21:
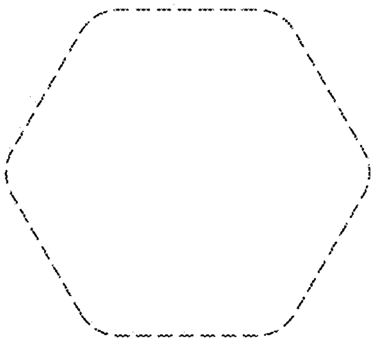
FIG. 21 is a back view of the SINGLE-DOSE LAUNDRY DETERGENT UNIT of FIG. 18.
Figure 22:
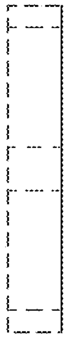
FIG. 22 is a left view of the SINGLE-DOSE LAUNDRY DETERGENT UNIT of FIG. 18.
Figure 23:
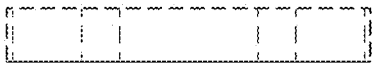
FIG. 23 is a bottom view of the SINGLE-DOSE LAUNDRY DETERGENT UNIT of FIG. 18.
Figure 24:
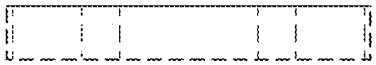
FIG. 24 is a top view of the SINGLE-DOSE LAUNDRY DETERGENT UNIT of FIG. 18.
Figure 25:
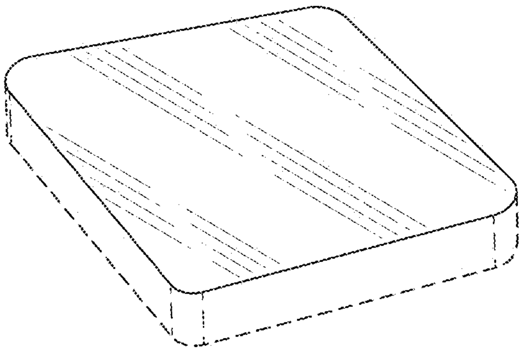
FIG. 25 is a perspective view of an embodiment of a SINGLE-DOSE LAUNDRY DETERGENT UNIT embodying a new design.
Figure 26:
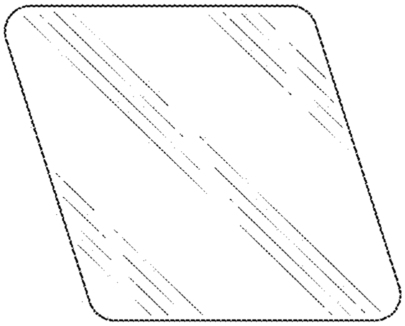
FIG. 26 is a front view of the SINGLE-DOSE LAUNDRY DETERGENT UNIT of FIG. 25.
Figure 27:
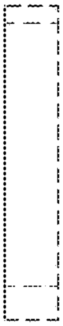
FIG. 27 is a right view of the SINGLE-DOSE LAUNDRY DETERGENT UNIT of FIG. 25.
Figure 28:
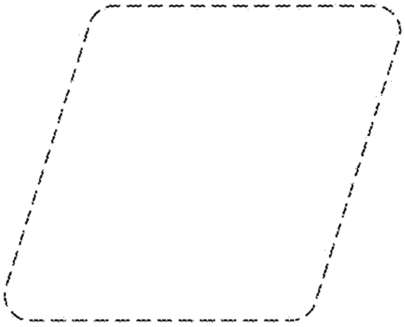
FIG. 28 is a back view of the SINGLE-DOSE LAUNDRY DETERGENT UNIT of FIG. 25.
Figure 29:
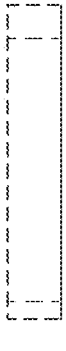
FIG. 29 is a left view of the SINGLE-DOSE LAUNDRY DETERGENT UNIT of FIG. 25.
Figure 30:
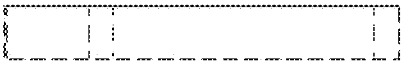
FIG. 30 is a bottom view of the SINGLE-DOSE LAUNDRY DETERGENT UNIT of FIG. 25.
Figure 31:
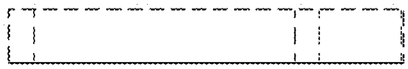
FIG. 31 is a top view of the SINGLE-DOSE LAUNDRY DETERGENT UNIT of FIG. 25.
Figure 32:
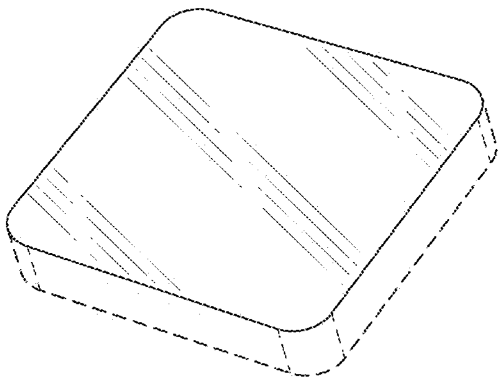
FIG. 32 is a perspective view of an embodiment of a SINGLE-DOSE LAUNDRY DETERGENT UNIT embodying a new design.
Figure 33:
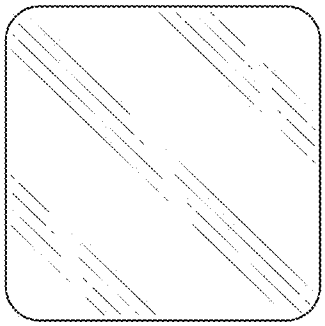
FIG. 33 is a front view of the SINGLE-DOSE LAUNDRY DETERGENT UNIT of FIG. 32.
Figure 34:
FIG. 34 is a right view of the SINGLE-DOSE LAUNDRY DETERGENT UNIT of FIG. 32.
Figure 35:
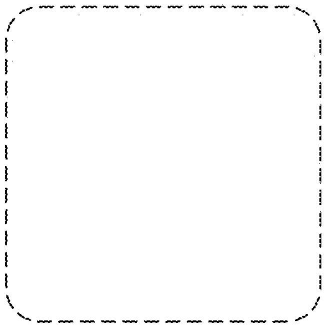
FIG. 35 is a back view of the SINGLE-DOSE LAUNDRY DETERGENT UNIT of FIG. 32.
Figure 36:
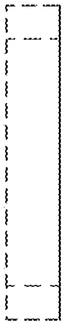
FIG. 36 is a left view of the SINGLE-DOSE LAUNDRY DETERGENT UNIT of FIG. 32.
Figure 37:
FIG. 37 is a bottom view of the SINGLE-DOSE LAUNDRY DETERGENT UNIT of FIG. 32.
Figure 38:
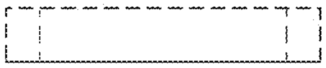
FIG. 38 is a top view of the SINGLE-DOSE LAUNDRY DETERGENT UNIT of FIG. 32.
Figure 39:
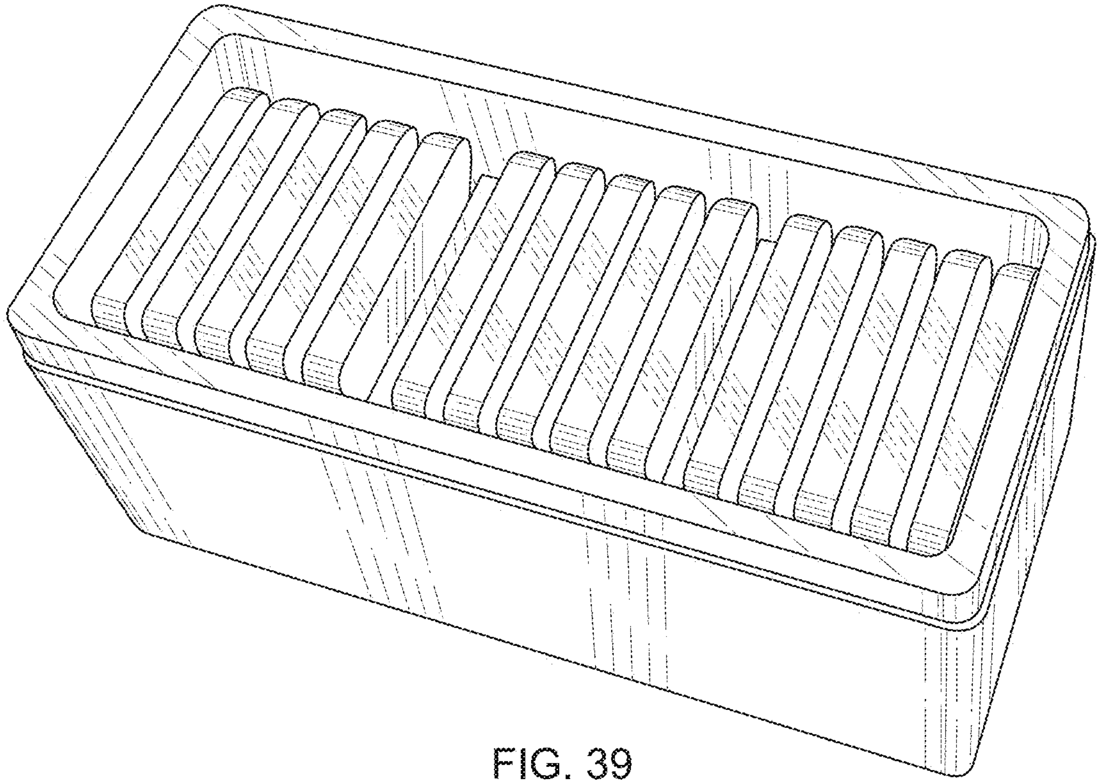
FIG. 39 is a perspective view of an embodiment of a CONTAINER without a lid embodying a new design.
Figure 40:
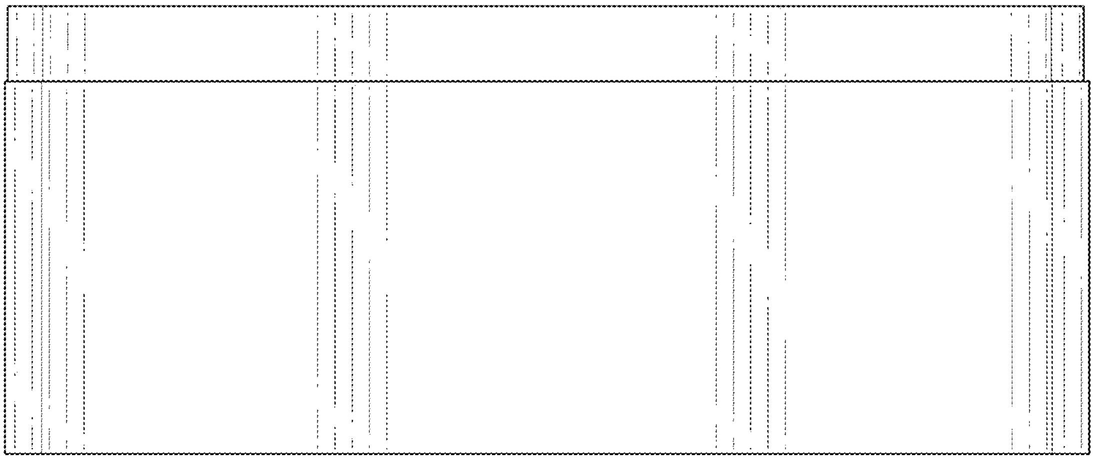
FIG. 40 is a right view of the CONTAINER of FIG. 39.
Figure 41:
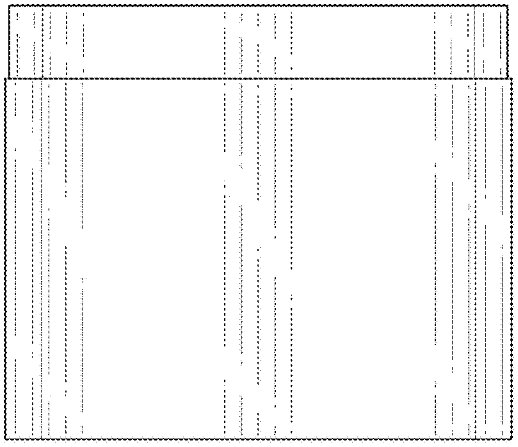
FIG. 41 is a back view of the CONTAINER of FIG. 39.
Figure 42:
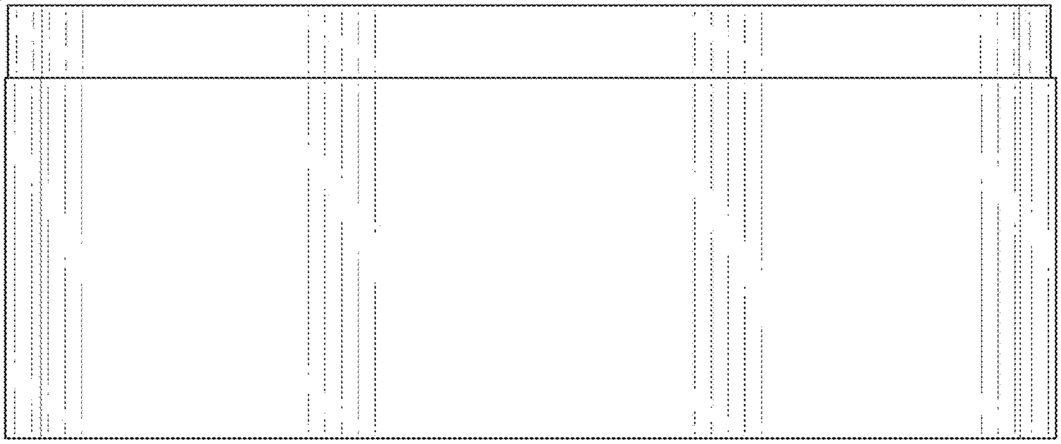
FIG. 42 is a left view of the CONTAINER of FIG. 39.
Figure 43:
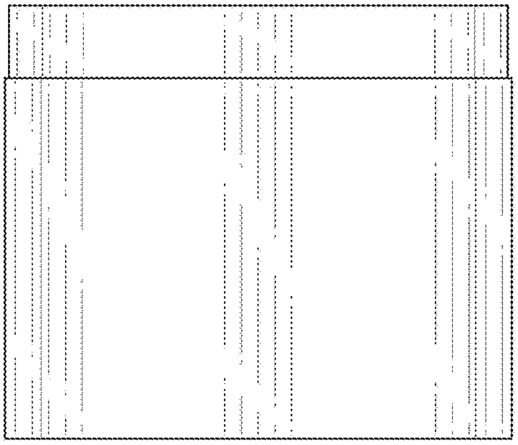
FIG. 43 is a front view of the CONTAINER of FIG. 39.
Figure 44:
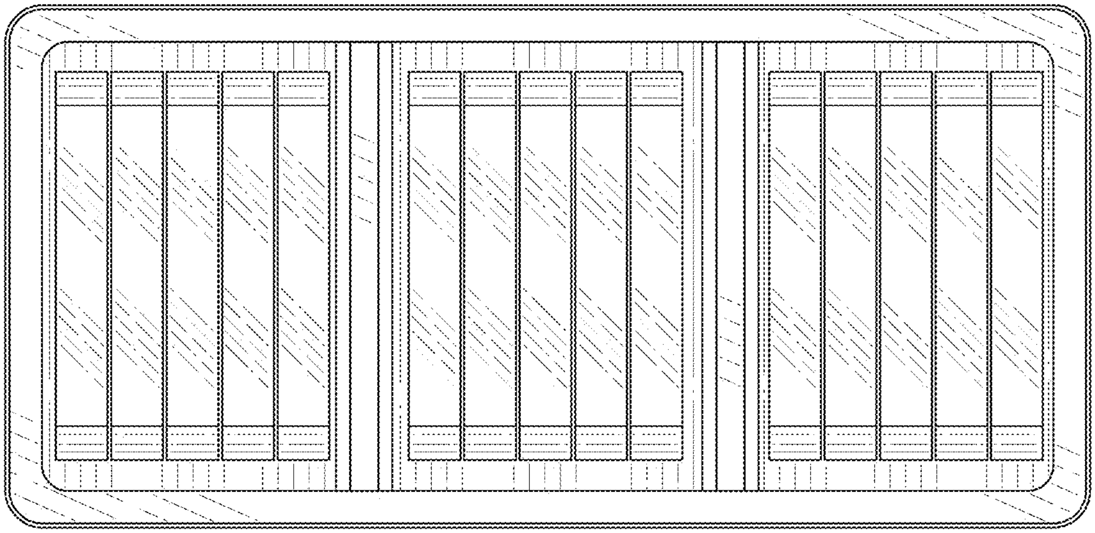
FIG. 44 is a top view of the CONTAINER of FIG. 39.
Figure 45:
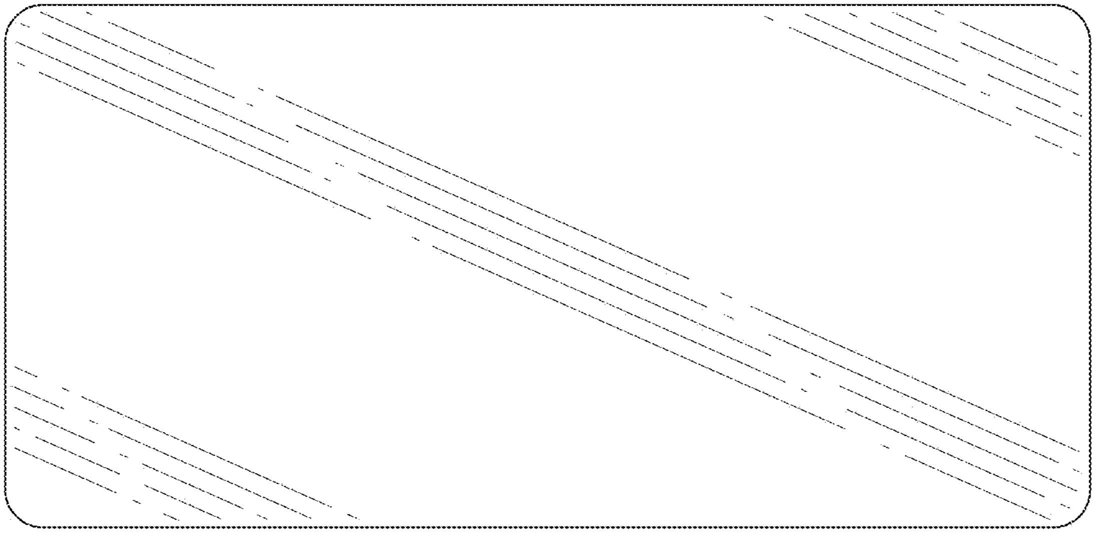
FIG. 45 is a bottom view of the CONTAINER of FIG. 39.
Figure 46:
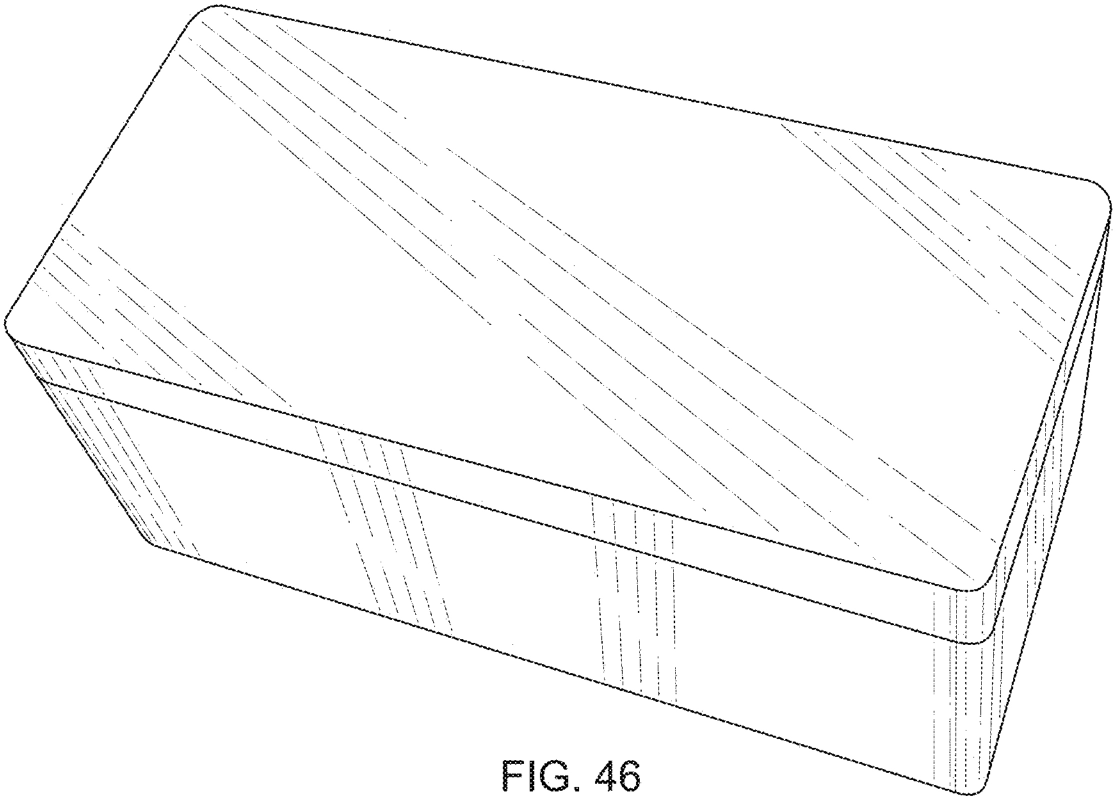
FIG. 46 is a perspective view of an embodiment of a CONTAINER with a lid embodying a new design.
Figure 47:
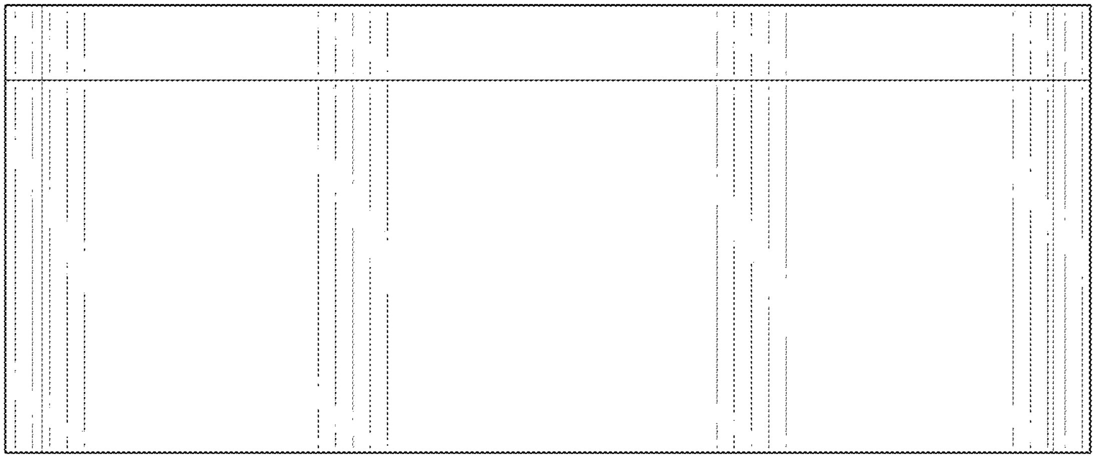
FIG. 47 is a right view of the CONTAINER of FIG. 46.
Figure 48:
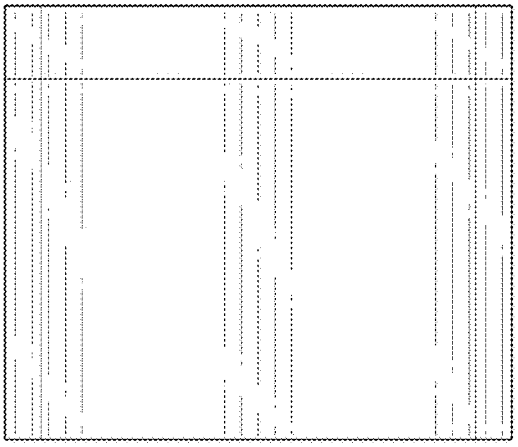
FIG. 48 is a back view of the CONTAINER of FIG. 46.
Figure 49:
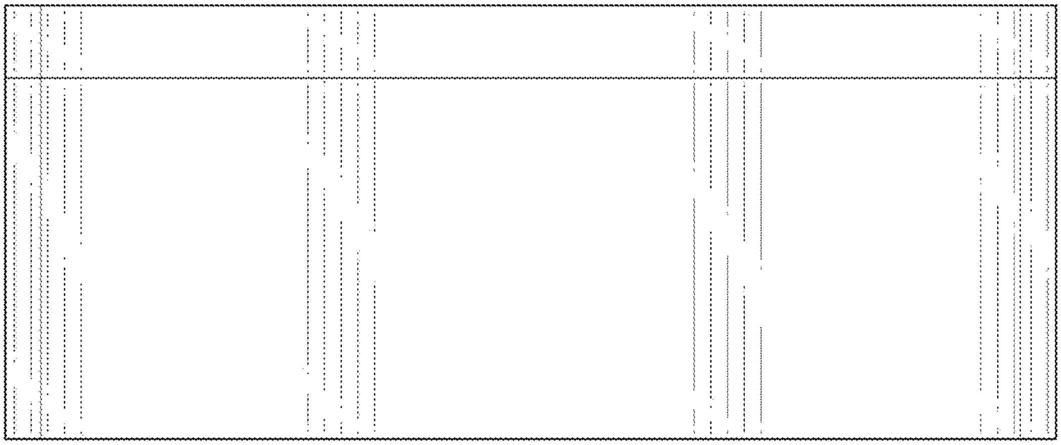
FIG. 49 is a left view of the CONTAINER of FIG. 46.
Figure 50:
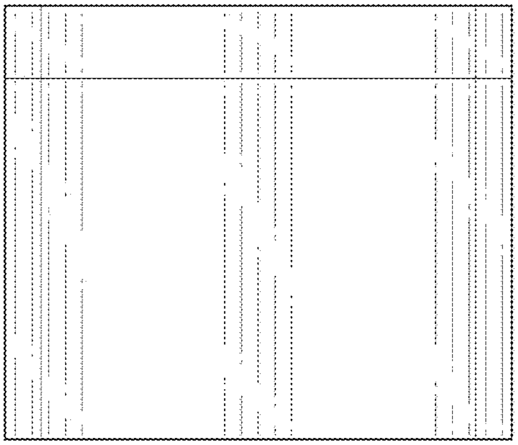
FIG. 50 is a front view of the CONTAINER of FIG. 46.
Figure 51:
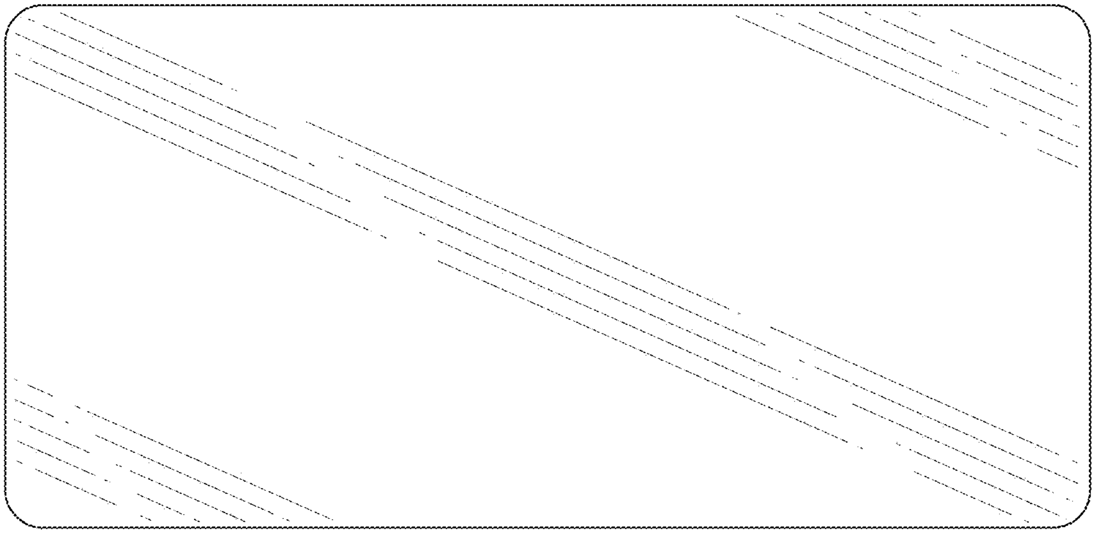
FIG. 51 is a top view of the CONTAINER of FIG. 46.
Figure 52:
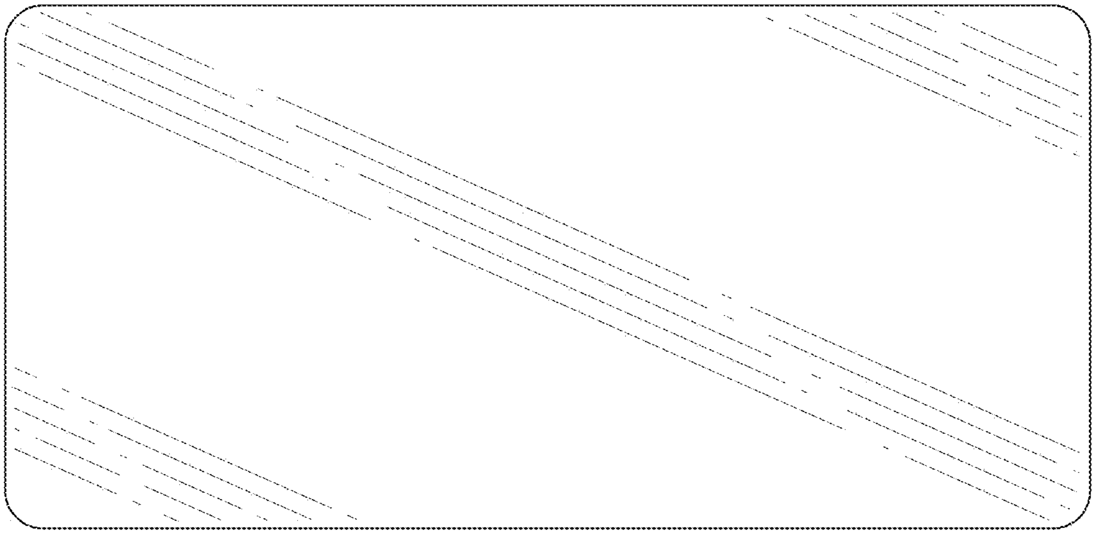
FIG. 52 is a bottom view of the CONTAINER of FIG. 46.

Washing of Black Pouches:

The 4 black velvet pouches are arranged overlapping each other in such a way that the water-soluble unit dose products are all next to each other, as shown in FIG. 6, in alternating order. The arranged pouches are placed at the back of the drum.

The washing machine is turned on and set to at delicate wash program, using mixed water at 50° F.+/−1° F. (via the water temperature control system) and 6 gpg hardness, no additional ballast load is added. The washing machine runs through the entire wash cycle. At end of the washing cycle, the pouches are removed from the washing machine and opened along three sides—all except the folded side—to ensure not spilling any residues.

The pouches are graded immediately after opening. The grades from two independent graders are recorded. The data is analyzed as a Latin Square design and the analysis incorporates washing machine and product position into the statistical model. Least square means and 95% upper confidence intervals are constructed. A water-soluble unit dose product is considered to have passed the test if a 95% one-sided upper confidence interval about the mean scale unit is less than 1.

Grading is made by visual observation of the residue remaining in/on the bag after the wash. The black pouches are graded according to the following qualitative scale:

0=no residues 0.5=very small spot of maximum 1 cm diameter

1=maximum 3 small, spread spots of maximum 2 cm diameter each, spots are flat (i.e., film-like) and translucent 2=more than 3 small spots of 2 cm diameter each up to the entire black pouch is covered with flat translucent residue 2.5=small opaque residue (i.e., gel-like) less than 1 cm diameter.

3=opaque residue (e.g., gel-like) with a diameter between 1 cm and 2 cm

4=opaque residue (e.g., gel-like) with diameter between 3 cm and 4 cm diameter

5=thick, gel-like residue with diameter between 4-6 cm diameter

6=thick, gel-like residue with diameter >6 cm diameter

7=product is substantially not dissolved; residue is soft and gel-like

8=product is substantially not dissolved; residue is hard and elastic (feels like silicone); Grade 8 is special as it indicates that the product may have been contaminated.

EXAMPLES

Example 1

As illustrated in FIG. 3, a first layer of fibrous elements is spun using a first spinning beam and collected on a forming belt. The forming belt having the first layer of fibers then passes under a second spinning beam that is modified with a particle addition system. The particle addition system is capable of substantially injecting particles toward a landing zone on the forming belt that is directly under the fibrous elements from the second spinning beam. Suitable particle addition systems may be assembled from a particle feeder, such as a vibratory, belt or screw feeder, and an injection system, such as an air knife or other fluidized conveying system. In order to aid in a consistent distribution of particles in the cross direction, the particles are preferably fed across about the same width as the spinning die to ensure particles are delivered across the full width of the composite structure. Preferably, the particle feeder is completely enclosed with the exception of the exit to minimize disruption of the particle feed. The co-impingement of particles and fibrous elements on the forming belt under the second spinning beam creates a composite structure where the particle packing is dilated and fibers substantially interpenetrate the inter-particle porosity.

Table 3 below sets forth non-limiting examples of dried fiber compositions of the present invention, which is used to make the fibrous elements. To make the fibrous elements, an aqueous solution, preferably having about 45% to 60% solids content, is processed through one or more spinning beams as shown in FIG. 3. A suitable spinning beam comprises a capillary die with attenuation airflow, along with drying airflow suitable to substantially dry the attenuated fibers before their impingement on the forming belt.

TABLE 3

| Fiber (F) Compositions, mass %: | | | | | | | |
|---|---|---|---|---|---|---|---|
| Component | F1 | F2 | F3 | F4 | F5 | F6 | F7 |
| LAS | 48.5 | 43.1 | 59.2 | 21.0 | 47.2 | 51.8 | 42.8 |
| AS | 0.0 | 21.6 | 0.0 | 42.0 | 23.6 | 12.9 | 21.4 |
| AES | 16.2 | 0.0 | 0.0 | 0.0 | 0.0 | 0.0 | 0.0 |
| PEG-PVAc | 0.00 | 0.0 | 5.9 | 3.2 | 0.0 | 0.0 | 0.0 |
| PVOH | 32.3 | 29.3 | 28.5 | 27.5 | 23.7 | 29.3 | 29.2 |
| PEO | 0.0 | 3.0 | 3.2 | 3.2 | 2.5 | 3.0 | 3.0 |

TABLE 3-continued

| Fiber (F) Compositions, mass %: | | | | | | | |
|---|---|---|---|---|---|---|---|
| Component | F1 | F2 | F3 | F4 | F5 | F6 | F7 |
| Hue Dye | 0.0 | 0.0 | 0.0 | 0.0 | 0.0 | 0.0 | 0.6 |
| Moist + misc. | 3.0 | 3.0 | 3.2 | 3.1 | 3.0 | 3.0 | 3.0 |
| Total | 100 | 100 | 100 | 100 | 100 | 100 | 100 |

Table 4 below sets forth non-limiting examples of a particle compositions of the present invention. Particles may be made by a variety of suitable processes including milling, spray-drying, agglomeration, extrusion, prilling, encapsulation, pastillization and any combination thereof. One or more particles may be mixed together before adding.

TABLE 4

| Particle (P) Compositions, mass %: | | | | | | | |
|---|---|---|---|---|---|---|---|
| Component | P1 | P2 | P3 | P4 | P5 | P6 | P7 |
| LAS | 0.0 | 0.0 | 7.6 | 9.5 | 8.1 | 10.8 | 4.4 |
| AS | 19.2 | 0.0 | 0.0 | 0.0 | 0.0 | 0.0 | 0.0 |
| AES | 4.8 | 45.0 | 26.4 | 21.6 | 24.6 | 21.6 | 26.3 |
| Sodium Carb. | 18.0 | 35.0 | 19.2 | 15.3 | 15.1 | 10.0 | 14.2 |
| Zeolite-A | 54.2 | 0.0 | 24.4 | 32.0 | 49.1 | 51.8 | 49.9 |
| Chelant | 0.0 | 0.0 | 0.0 | 0.0 | 0.0 | 0.0 | 0.0 |
| PE20 | 0.0 | 0.0 | 10.4 | 3.7 | 0.0 | 3.5 | 0.0 |
| Trilon | 0.0 | 0.0 | 0.0 | 0.0 | 0.0 | 0.0 | 0.0 |
| AcuSol | 0.0 | 0.0 | 0.0. | 0.0 | 0.0 | 0.0 | 0.0 |
| Pluronic F38 | 0.0 | 0.0 | 0.0 | 0.0 | 0.0 | 0.0 | 1.8 |
| Disp. Polymer | 0.0 | 0.0 | 0.0 | 0.0 | 0.0 | 0.0 | 0.0 |
| PEG4k | 0.8 | 0.0 | 0.0 | 8.22 | 0.0 | 0.0 | 0.0 |
| Silica | 0.0 | 15.0 | 8.2 | 0.0 | 0.0 | 0.0 | 0.0 |
| Citrate | 0.0 | 0.0 | 0.0 | 0.0 | 0.0 | 0.0 | 0.0 |
| PVOH + PEO | 0.0 | 0.0 | 0.0 | 0.0 | 0.0 | 0.0 | 0.0 |
| Moist + misc. | 3.0 | 5.0 | 3.8 | 9.81 | 3.1 | 2.3 | 3.3 |
| Total | 100 | 100 | 100 | 100 | 100 | 100 | 100 |
| LAS:AES | 0:4.8 | 0:45 | 7.6:26.4 | 9.5:21.6 | 8.1:24.6 | 10.8:21.6 | 4.4:26.3 |

TABLE 4

| Particle (P) Compositions, mass % continued: | | | | | | |
|---|---|---|---|---|---|---|
| Component | P8 | P9 | P10 | P11 | P12 | P13 |
| LAS | 17.2 | 13.7 | 19.2 | 20.8 | 25.7 | 23.3 |
| AS | 0.0 | 0.0 | 0.0 | 1.1 | 0.0 | 0 |
| AES | 34.3 | 27.4 | 25.7 | 26.6 | 25.2 | 21.9 |
| Sodium Carb. | 21.6 | 21.7 | 20.6 | 22.2 | 22 | 20.2 |
| Zeolite-A | 0.0 | 0.0 | 0.0 | 0.0 | 0 | 0 |
| Chelant | 0.0 | 0.0 | 3.5 | 0.0 | 2.0 | 3.5 |
| PE20 | 3.5 | 1.6 | 3.4 | 3.4 | 3.5 | 3.5 |
| Pluronic F38 | 0.0 | 0.0 | 0.0 | 0.0 | 0.0 | 0 |
| Disp. Polymer | 0.0 | 16.5 | 8.1 | 8.4 | 7.3 | 6.7 |
| PEG4k | 0.0 | 0.0 | 0.0 | 0.0 | 0.0 | 0.0 |
| Silica | 20.2 | 14.5 | 16.4 | 12.3 | 8.1 | 8.9 |
| Citrate | 0.0 | 0.0 | 0.0. | 0.0 | 1.8 | 1.7 |
| Nonionic | 0.0 | 0.0 | 0.0 | 0.0 | 0.0 | 6.4 |
| PVOH + PEO | 0.0 | 0.0 | 0.0 | 1.7 | 0.0 | 0 |
| Moist + misc. | 3.2 | 4.6 | 3.1 | 3.5 | 4.4 | 3.9 |
| Total | 100 | 100 | 100 | 100 | 100 | 100 |
| LAS:AES | 17.2:34.3 | 13.7:27.4 | 19.2:25.7 | 20.8:26.6 | 25.7:25.2 | 23.3:21.9 |

Resulting products are exemplified in Table 5, providing structural detail for product chasses by fiber and particle components (from Tables 3 and 4, respectively), with the net chassis composition for the product. Note that other product adjunct materials such as perfume, enzymes, suds suppressor, bleaching agents, etc. may be added to a chassis.

Wash Residue Test Grades are shown for each chassis. Chasses exemplify a range of detergent products having a significant proportion of ethoxylated anionic surfactant (AES).

TABLE 5

| Product Chasses (C) | | | | | | |
|---|---|---|---|---|---|---|
| Chassis | C1 | C2 | C3 | C4 | C5 | C6 |
| Fiber type | F1 | F2 | F2 | F2 | F2 | F2 |
| Fiber wt % | 25% | 25% | 25% | 28% | 17% | 25.59% |
| Particle type | P1 | P1 | P2 | P3 | P3 | P4 |
| Particle wt % | 75% | 75% | 75% | 72% | 83% | 67.1% |
| Basis wt, gsm | 3103 | 3104 | 2125 | 2477 | 4070 | 2900 |
| Formula, g/dose: | | | | | | |
| LAS | 2.5 | 2.2 | 1.5 | 3.0 | 3.6 | 1.8 |
| AS | 2.5 | 3.6 | 0.8 | 1.0 | 1.0 | 0.57 |
| AES | 2.0 | 1.2 | 4.7 | 3.0 | 5.9 | 1.5 |
| Sodium Carb. | 2.8 | 2.8 | 3.7 | 2.1 | 4.3 | 1.06 |
| Zeolite-A | 8.4 | 8.4 | 0.0 | 2.8 | 5.5 | 2.2 |
| Silica | 0.0 | 0.0 | 1.6 | 1.0 | 2.0 | 0.0 |
| PEG4k | 0.1 | 0.1 | 0.0 | 0.0 | 0.0 | 0.57 |
| PE20 | 0.0 | 0.0 | 0.0 | 1.5 | 2.3 | 0.25 |
| Pluronic F38 | 0.0 | 0.0 | 0.0 | 0.0 | 0.0 | 0.0 |
| Disp polymer | 0.0 | 0.0 | 0.0 | 0.0 | 0.0 | 0.0 |
| PVOH + PEO | 1.7 | 1.7 | 1.1 | 1.5 | 1.4 | 0.86 |
| moist & misc | 0.5 | 0.5 | 0.6 | 0.5 | 0.8 | 0.76 |
| Total chassis | 20.5 | 20.5 | 14.0 | 16.4 | 26.8 | 10.3 |
| Residue Test | Fail | Pass | Fail | Pass | Pass | Fail |
| Mean grade | 6.5 | 0.7 | 5.2 | 0.3 | 0.0 | 4 |
| Stdev | 2.8 | 0.8 | 1.7 | 0.6 | 0.0 | 0.5 |
| LAS:AES | 2.5:2.0 | 2.2:1.2 | 1.5:4.7 | 3.0:3.0 | 3.6:5.9 | 1.8:1.5 |

| Chassis | C7 | C8 | C9 | C10 | C11 | C12 | C13 |
|---|---|---|---|---|---|---|---|
| Fiber type | F2 | F2 | F6 | F2 | F2 | F2 | F7 |
| Fiber wt % | 26% | 21% | 22% | 27% | 24% | 28% | 26% |
| Particle type | P5 | P6 | P7 | P8 | P12 | P12 | P13 |
| Particle wt % | 74% | 79% | 78% | 73% | 76% | 72% | 74% |
| Basis wt, gsm | 2580 | 2706 | 3047 | 2900 | 3599 | 2801 | 3123 |
| Formula, g/dose: | | | | | | | |
| LAS | 2.9 | 3.1 | 3.0 | 4.2 | 8.3 | 2.0 | 5.1 |
| AS | 1.0 | 0.8 | 1.0 | 1.1 | 0 | 0.3 | 0.8 |
| AES | 3.1 | 3.1 | 3.7 | 3.8 | 5.9 | 1.4 | 3.2 |
| Nonionic | 0.0 | 0.0 | 0.0 | 0.0 | 0.0 | 0.0 | 1.0 |
| Sodium Carb. | 1.9 | 1.4 | 1.4 | 3.0 | 2.6 | 1.2 | 3 |
| Zeolite-A | 6.2 | 7.5 | 7.5 | 0.0 | 0.0 | 0.0 | 0.0 |
| Silica | 0.0 | 0.0 | 0.0 | 2.3 | 0.2 | 0.4 | 0.0 |
| PEG4k | 0.0 | 0.0 | 0.0 | 0.0 | 0.0 | 0.0 | 0.0 |
| PE20 | 0.0 | 0.3 | 0.0 | 0.2 | 0.4 | 0.2 | 0.5 |
| Pluronic F38 | 0.0 | 0.0 | 0.3 | 0.0 | 0.0 | 0.0 | 0.0 |
| Disp polymer | 0.0 | 0.0 | 0.0 | 2.3 | 0.0 | 0.4 | 1.3 |
| PVOH + PEO | 1.4 | 1.2 | 1.5 | 1.7 | 0.9 | 0.5 | 1.2 |
| moist & misc | 0.5 | 0.4 | 0.6 | 0.5 | 0.6 | 3.8 | 0.7 |
| Total chassis | 17.0 | 17.8 | 19.0 | 19.1 | 15.4 | 7.4 | 18.7 |
| Residue Test | Pass | Pass | Pass | Fail | Pass | Pass | Pass |
| Mean grade | 0.0 | 0.0 | 0.8 | 1.6 | 0.0 | 0.0 | 0.0 |
| Stdev | 0.0 | 0.0 | 1.5 | 1.1 | 0.0 | 0.0 | 0.0 |
| LAS:AES | 2.9:3. | 3.1:3.1 | 3.0:3.7 | 4.2:3.8 | 8.3:5.9 | 2.0:1.4 | 5.1:3.2 |

TABLE 6

| Particle | P4 | P12 | P13 | |
|---|---|---|---|---|
| Density | 604 | 370 | 320 | g/L |
| D10 | 280 | 325 | 425 | μm |
| D50 | 610 | 600 | 600 | μm |
| D90 | 1000 | 1090 | 920 | μm |

As shown in Table 5 and Table 6 and discussed above, C11 and C12 comprises both F2 and P12 while C13 comprises F7 and P13. P12 and P13 have surprising advantages over the other particles by having a density of between 250 g/L to 400 g/L and a particle size distribution such that the D10 is greater than about 300 micrometers and the D90 is less than about 1100 micrometers. Additionally, as shown in Table 4 both P12 and P13 achieve an LAS:AES ratio of greater than 1.0.

Without being bound by theory, it has been found that particles having an LAS:AES ratio greater than 1 created by introducing LAS to a separate slurry or agglomeration are capable of producing better fibrous detergent unit doses versus fibrous detergent unit doses having similar amounts or greater amounts of LAS that introduce the LAS through the fibrous web. It is believed that the LAS particles introduced through the agglomeration create lower density particles that allow the active surfactant to be more readily available for cleaning. As shown in Table 5, the use of a particle exhibiting low density and an LAS:AES ratio of greater than 1 results in PASS rates for the Residue test with mean grades and standard deviations of 0.0. This is especially beneficial in that the composition does not require a significant amount of inorganic dissolution aid such in contrast to Chassis C8. In comparison, other Chassis with LAS:AES ratios of greater than 1 that introduce the LAS through the web system and do not utilize particles having a LAS:AES ratio of greater than 1 (C1 using F1 and P1, C2 using F2 and P1, C4 using F2 and P3, C6 using F2 and P4, C8 using F2 and P6, C10 using F2 and p8) either FAIL or PASS with much higher standard deviations and results that are not as clean. As previously stated, C8 requires an inorganic dissolution aid (zeolite). Additionally, as shown by C10 which has a total LAS:AES ratio of 1.1, a chassis that brings in the majority of LAS through the web can FAIL.

As shown in Table 4, the particle may comprise less than 5% by weight of an inorganic dissolution aid, preferably between 0% and 5% by weight of an inorganic dissolution aid, more preferably between 0.01% and 3% by weight of an inorganic dissolution aid, even more preferably between 0.001% and 1% by weight of an inorganic dissolution aid.

As shown in Table 5, the water-soluble unit dose article may comprise less than 5% by weight of an inorganic dissolution aid, preferably between 0% and 5% by weight of an inorganic dissolution aid, more preferably between 0.01% and 3% by weight of an inorganic dissolution aid, even more preferably between 0.001% and 1% by weight of an inorganic dissolution aid.

This effect of using a low density particle with a ratio of LAS: AES greater than 1 is further exemplified by C6 which utilizes a higher density particle, P4 (shown in Table 6) and as shown in Table 5, P4 combined with F2 comprises a total product LAS:AES ratio of greater than 1 and does not pass the residue test. As previously stated and without being bound by theory, it is believed that the lower density particles allow for increased dissolution rates therefore making the surfactant more readily available and reducing the possibility for residue while increasing surfactant availability.

Raw Materials for Example 1

LAS is linear alkylbenzenesulfonate having an average aliphatic carbon chain length $C_{11}$-$C_{12}$ supplied by Stepan, Northfield, Illinois, USA or Huntsman Corp. HLAS is acid form.

AES is $C_{12-14}$ alkylethoxy (3) sulfate, $C_{14-15}$ alkylethoxy (2.5) sulfate, or $C_{12-15}$ alkylethoxy (1.8) sulfate, supplied by Stepan, Northfield, Illinois, USA or Shell Chemicals, Houston, TX, USA.

AS is a $C_{12-14}$ sulfate, supplied by Stepan, Northfield, Illinois, USA, and/or a mid-branched alkyl sulfate.

Dispersant Polymer (Disp. Polymer) is molecular weight 70,000 and acrylate:maleate ratio 70:30, supplied by BASF, Ludwigshafen, Germany.

PEG-PVAc polymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units. Available from BASF (Ludwigshafen, Germany).

Ethoxylated Polyethylenimine (PE20) is a 600 g/mol molecular weight polyethylenimine core with 20 ethoxylate groups per —NH. Available from BASF (Ludwigshafen, Germany).

FIGS. 4-10 show an embodiment of a SINGLE-DOSE LAUNDRY DETERGENT UNIT embodying a new design.

FIGS. 11-18 show an embodiment of a SINGLE-DOSE LAUNDRY DETERGENT UNIT embodying a new design.

FIGS. 18-24 show an embodiment of a SINGLE-DOSE LAUNDRY DETERGENT UNIT embodying a new design.

FIGS. 25-31 show an embodiment of a SINGLE-DOSE LAUNDRY DETERGENT UNIT embodying a new design.

FIGS. 32-38 show an embodiment of a SINGLE-DOSE LAUNDRY DETERGENT UNIT embodying a new design.

FIGS. 39-45 show an embodiment of a CONTAINER without a lid embodying anew design.

FIGS. 46-52 show an embodiment of a CONTAINER with a lid embodying anew design.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

For clarity purposes, the total "% wt" values do not exceed 100% wt.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular examples and/or embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble unit dose article comprising a water-soluble fibrous structure comprising a particle comprising a ratio by weight of Linear Alkylbenzene Sulfonate to Alkylethoxylated Sulfate of greater than 1.2, wherein the particle exhibits a density of less than 500 grams per liter and exhibits a particle size distribution such that D10 is greater than about 300 micrometers and the D90 is less than about 1100 micrometers, wherein the linear alkylbenzene sulfonate has a carbon chain length of C6-C20 and wherein the alkylethoxylated sulfate has a carbon chain length of C12-C18 and an average degree of the ethoxylation from about 0.5 to about 3.0.

2. The water-soluble unit dose article of claim 1, wherein said water-soluble unit dose article comprises less than 5% by weight of an inorganic dissolution aid.

3. The water-soluble unit dose article of claim 1, wherein the particle further comprises between 0.001% and 1% by weight of an inorganic dissolution aid.

4. The water-soluble unit dose article of claim 2, wherein the inorganic dissolution aid comprises zeolite.

5. The water-soluble unit dose article of claim 1, wherein the alkylethoxylated sulfate preferably has an average degree of ethoxylation of from about 1 to about 3.5.

6. The water-soluble unit dose of claim 1, wherein the water-soluble unit dose further comprises a rheology modifier, wherein the rheology modifier is an alkoxylated polyalkyleneimine, wherein said alkoxylated polyalkyleneimine has a polyalkyleneimine core with one or more alkoxy side chains bonded to at least one nitrogen atom in the polyalkyleneimine core, an ethylene oxide-propylene oxide-ethylene oxide (EOx1POyEOx2) triblock copolymer wherein each of x1 and x2 is in the range of about 2 to about 140 and y is in the range of from about 15 to about 70, and mixtures thereof.

7. The water-soluble unit dose article of claim 6, wherein said alkoxylated polyalkyleneimine comprises ethoxylate (EO) groups, propoxylate (PO) groups, or combinations thereof, preferably ethoxylate (EO) groups.

8. The water-soluble unit dose article of claim 1, wherein the particle exhibits a particle size distribution such that D10 is between 300 micrometers and 500 micrometers.

9. The water-soluble unit dose article of claim 1, further comprising perfume microcapsules.

10. The water-soluble unit dose article of claim 1, further comprising a hueing agent.

11. The water-soluble unit dose article of claim 1, further comprising a bleaching agent.

12. The water-soluble unit dose article of claim 1, further comprising an enzyme.

13. The water-soluble unit dose article of claim 1, further comprising a printed area.

14. The water-soluble unit dose article of claim 1, further comprising an aversive agent.

15. The water-soluble unit dose article of claim 1, further comprising a nonionic surfactant.

16. A water-soluble unit dose article comprising a water-soluble fibrous structure comprising a particle comprising a ratio by weight of Linear Alkylbenzene Sulfonate to Alkylethoxylated Sulfate of between 1.2 and 2.0, wherein water-soluble unit dose comprises a rheology modifier, wherein the rheology modifier is an alkoxylated polyalkyleneimine, wherein said alkoxylated polyalkyleneimine has a polyalkyleneimine core with one or more alkoxy side chains bonded to at least one nitrogen atom in the polyalkyleneimine core, an ethylene oxide-propylene oxide-ethylene oxide (EOx1POyEOx2) triblock copolymer wherein each of x1 and x2 is in the range of about 2 to about 140 and y is in the range of from about 15 to about 70, and mixtures thereof: wherein the particle has a density of less than 500 g/L.

17. The water-soluble unit dose article of claim 16, wherein the particle further comprises between 0.001% and 1% by weight of an inorganic dissolution aid.

18. The water-soluble unit dose article of claim 16, wherein the particle exhibits a particle size distribution such that D10 is greater than about 300 micrometers and the D90 is less than about 1100.

19. The water-soluble unit dose of claim 1, wherein the particle has a density of about 250 g/L to about 400 g/L.

20. The water-soluble unit dose article of claim 16, wherein the particle has a density of about 250 g/L to about 400 g/L.

21. The water-soluble unit dose article of claim 1, wherein the linear alkylbenzene sulfonate comprises a carbon chain length of from C11-C18.

22. The water-soluble unit dose article of claim 1, wherein the linear alkylbenzene sulfonate comprises a carbon chain length of from C11-C14.

* * * * *